US011171676B2

(12) United States Patent
Muehlmann et al.

(10) Patent No.: US 11,171,676 B2
(45) Date of Patent: Nov. 9, 2021

(54) DYNAMIC SENSITIVITY CONTROL IN A NEAR-FIELD COMMUNICATION RECEIVER

(71) Applicant: NXP B.V., Eindhoven (NL)

(72) Inventors: Ulrich Andreas Muehlmann, Graz (AT); Shuli Chi, Graz (AT); Martin Hrastnik, Maribor (SI)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/928,411

(22) Filed: Jul. 14, 2020

(65) Prior Publication Data
US 2021/0036726 A1 Feb. 4, 2021

(30) Foreign Application Priority Data

Aug. 1, 2019 (EP) .................................... 19189656

(51) Int. Cl.
*H04B 1/10* (2006.01)
*H04B 5/02* (2006.01)
*H04L 27/20* (2006.01)

(52) U.S. Cl.
CPC ............ *H04B 1/1027* (2013.01); *H04B 5/02* (2013.01); *H04L 27/2071* (2013.01)

(58) Field of Classification Search
CPC .. H04B 1/0028; H04B 5/0025; H04B 17/318; H04B 5/0031; H04B 1/1027; H04B 5/02;
(Continued)

(56) References Cited

U.S. PATENT DOCUMENTS 4,868,885 A * 9/1989 Perry .................... H04W 24/00
455/10
5,461,646 A * 10/1995 Anvari ................. H04B 7/0857
375/267
(Continued)

FOREIGN PATENT DOCUMENTS

JP    2006120090 A    5/2006
JP    2015012381 A    1/2015
(Continued)

*Primary Examiner* — Lana N Le

(57) ABSTRACT

Disclosed is a method for sensitivity control in a near-field communication, NFC, device operating in a receiving mode. The method comprises calculating a threshold value, using a threshold value calculating unit, as a function of a determined current received signal strength indicator, RSSI, value, optionally a determined current gain control, GC, value, and further optionally a so-called margin value that is a product-specific parameter, and applying the calculated threshold value as a threshold parameter to a threshold comparison unit, which is configured to receive, as input. a first time-derivative signal derived from a combined output signal that is determined as a function of a digital I-channel signal output and a digital Q-channel signal output of an I&Q demodulating block, to compare the first time-derivative signal with the applied threshold parameter, and to provide a binary output that is indicative of whether the input first time-derivative signal is greater than the applied threshold parameter or not.

18 Claims, 15 Drawing Sheets

(58) Field of Classification Search
CPC .. H04B 17/327; H04B 17/336; H04B 17/373; H04B 17/382; H04B 3/46; H04W 52/52; H04W 56/001; H04W 74/0891; H04W 84/18; H04W 8/005; H04W 24/08; H04W 24/10; H04W 88/06; G06K 7/10237; H04L 27/2071
See application file for complete search history.

(56) References Cited

U.S. PATENT DOCUMENTS

| | | | | |
|---|---|---|---|---|
| 5,479,453 | A * | 12/1995 | Anvari | H04B 7/0857 375/348 |
| 8,971,380 | B2 * | 3/2015 | Forenza | H04B 7/0417 375/141 |
| 9,654,179 | B2 * | 5/2017 | Shultz | H04B 5/0012 |
| 10,523,252 | B2 * | 12/2019 | Goodman | H04B 1/1036 |
| 2008/0129461 | A1 * | 6/2008 | Abraham | G06K 19/0723 340/10.1 |
| 2009/0286498 | A1 * | 11/2009 | Katayanagi | H04B 1/1081 455/277.2 |
| 2011/0165847 | A1 * | 7/2011 | Kawasaki | H04B 3/20 455/73 |
| 2013/0195229 | A1 * | 8/2013 | Cheng | H04L 27/16 375/343 |
| 2014/0066060 | A1 * | 3/2014 | Ngai | H04W 24/08 455/434 |
| 2015/0271755 | A1 * | 9/2015 | Karri | H04W 28/0221 370/252 |
| 2017/0094543 | A1 * | 3/2017 | Narasimha | H04W 16/14 |
| 2020/0244357 | A1 * | 7/2020 | Heath | H04B 1/10 |
| 2021/0169417 | A1 * | 6/2021 | Burton | A61B 5/4809 |

FOREIGN PATENT DOCUMENTS

| | | | |
|---|---|---|---|
| JP | 2016062160 A | 4/2016 | |
| WO | WO-2013123341 A2 * | 8/2013 | ............ H04W 12/08 |

* cited by examiner

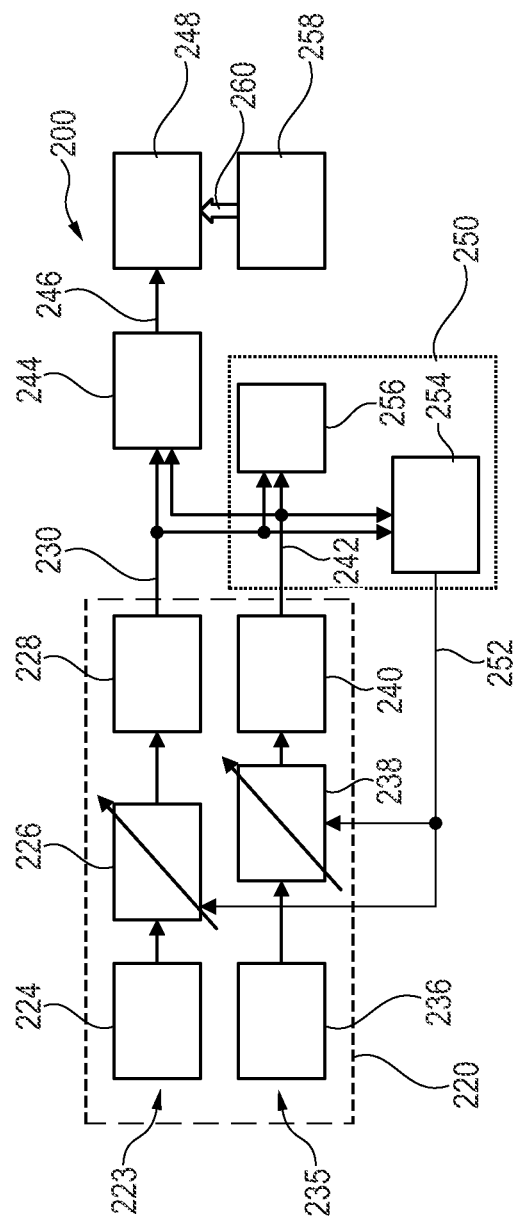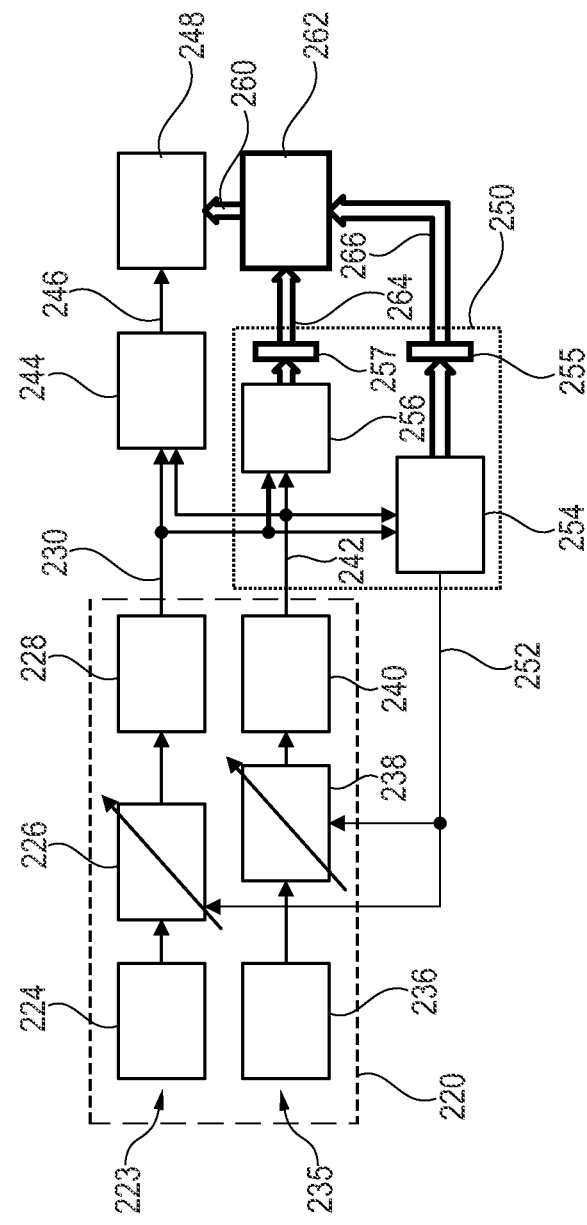
Fig. 2A (Prior art)
Fig. 2B

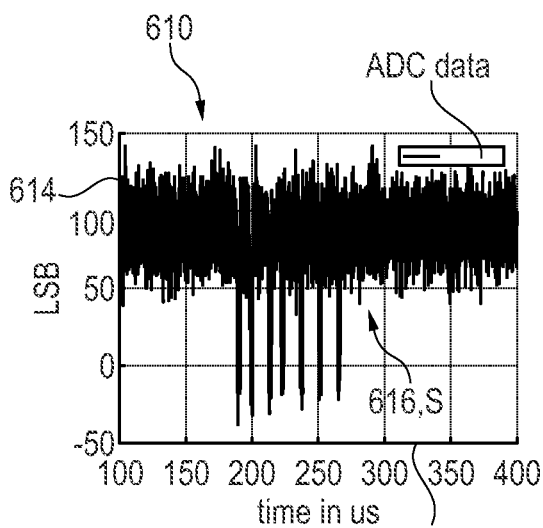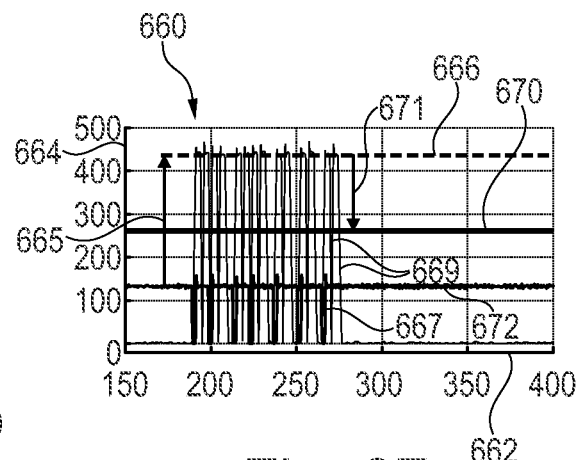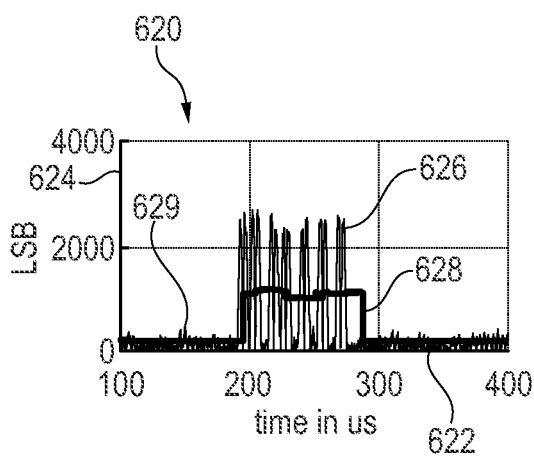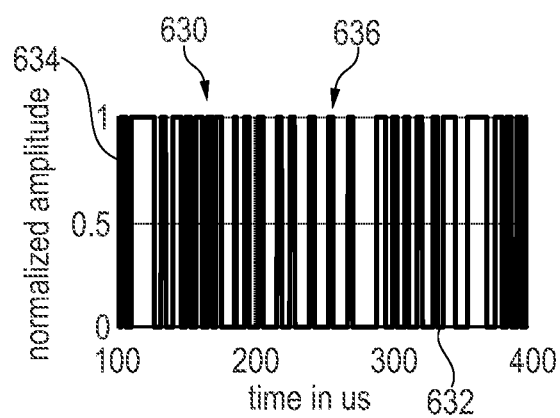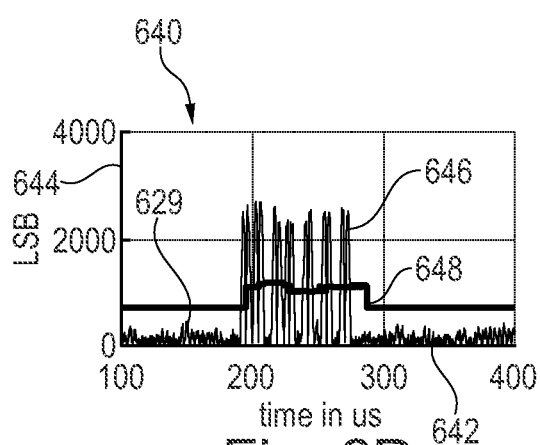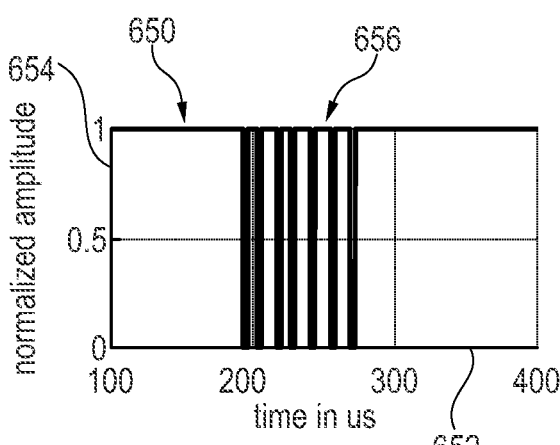

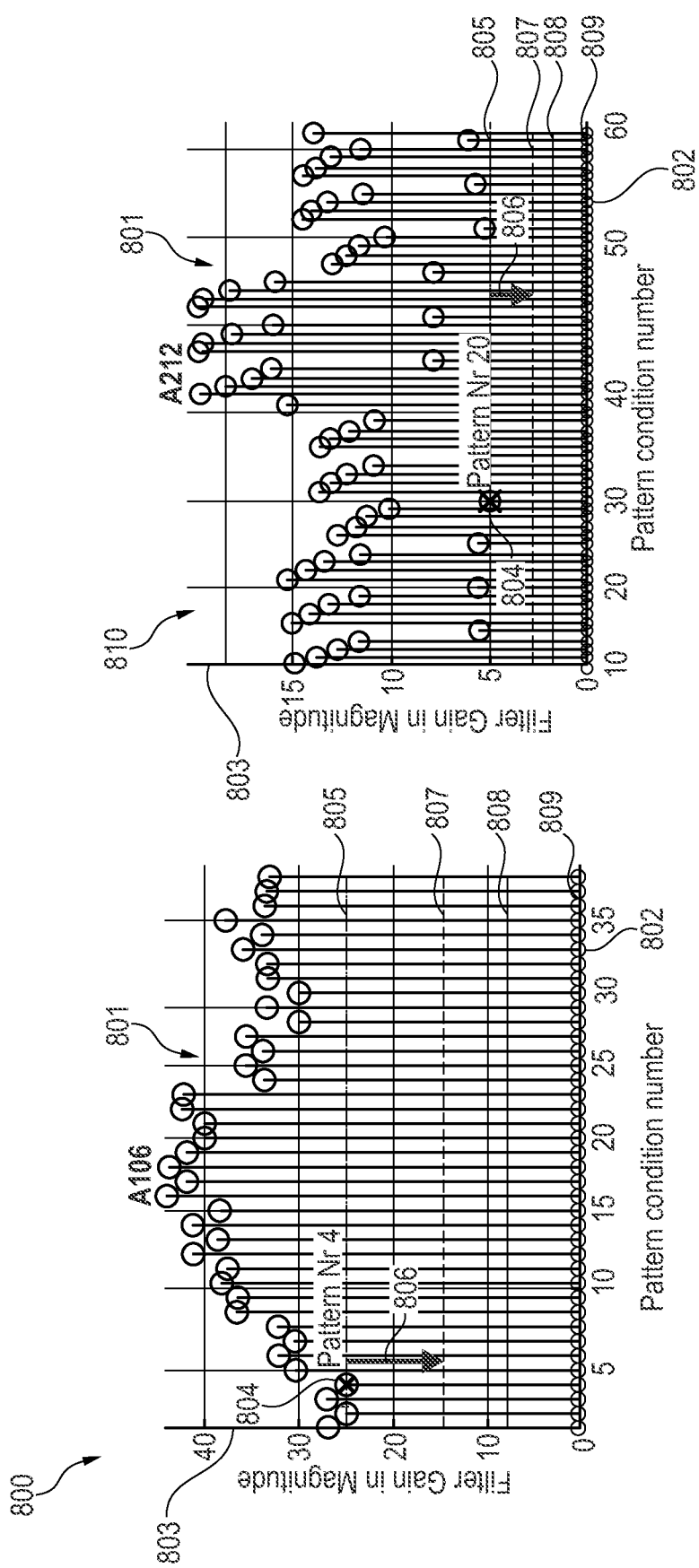

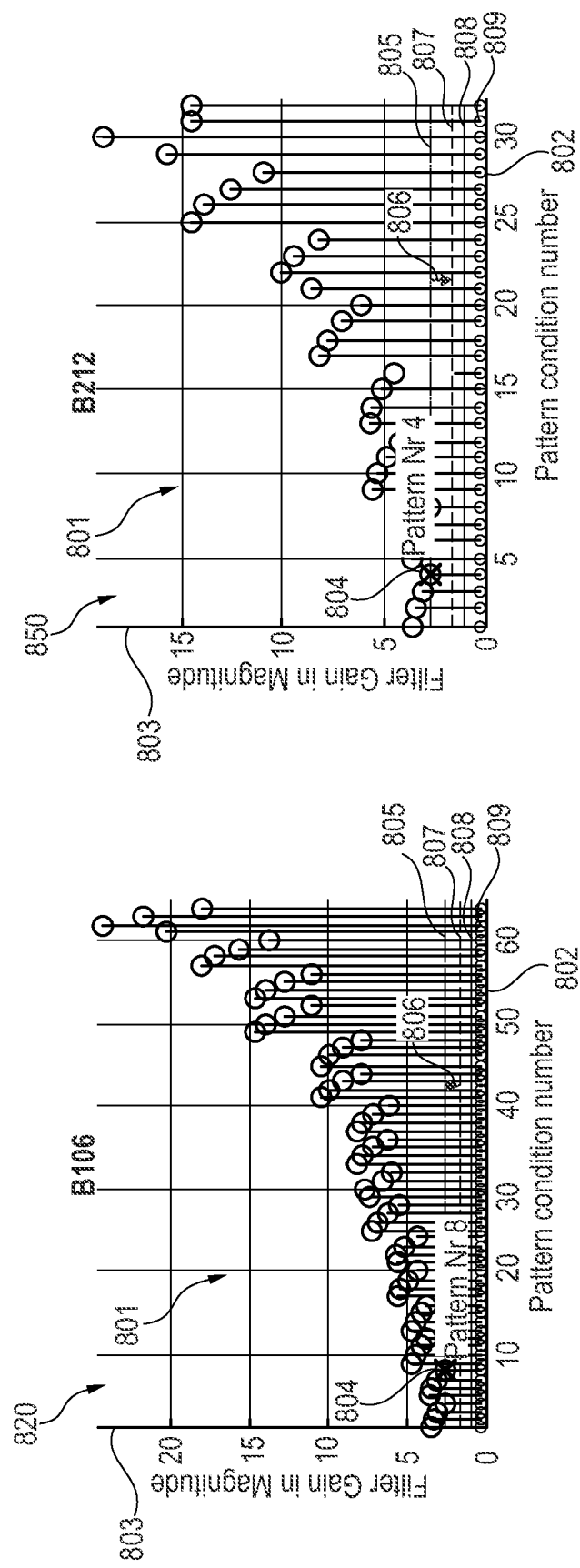

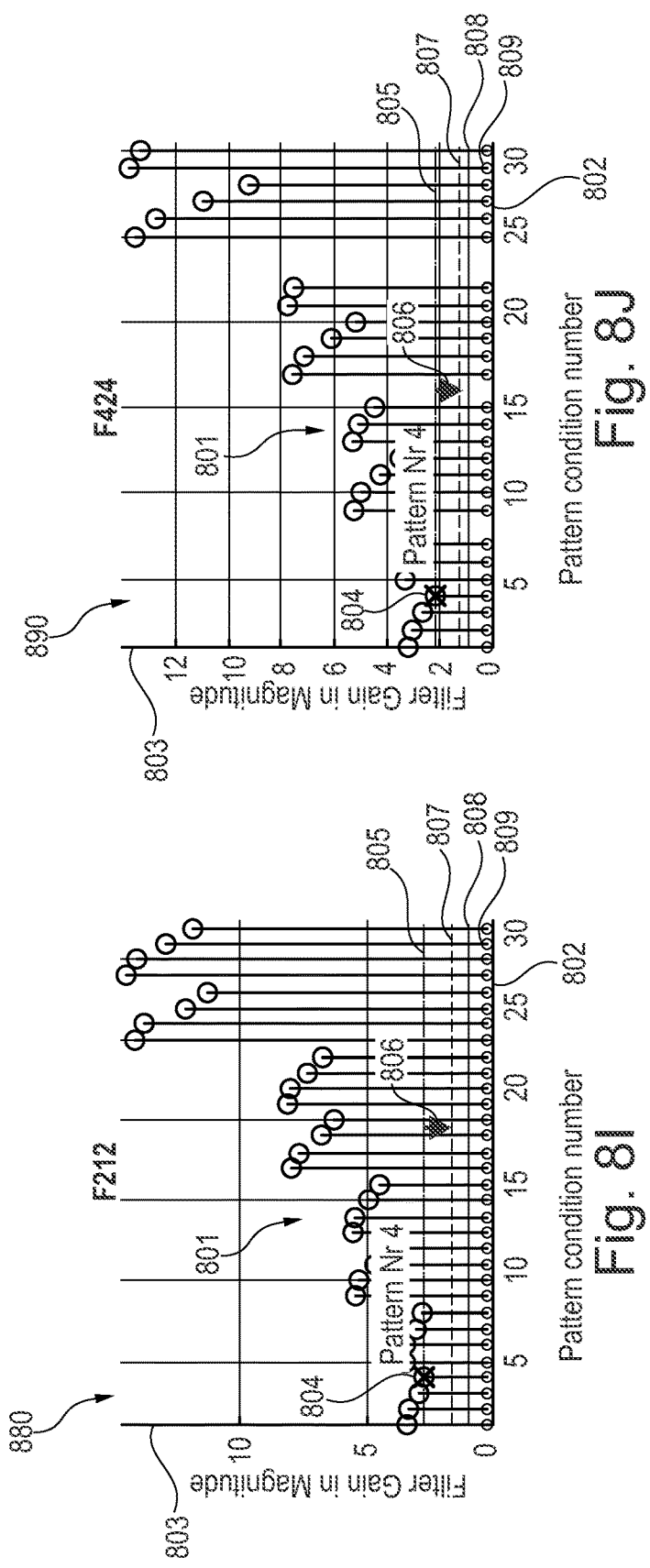

DYNAMIC SENSITIVITY CONTROL IN A NEAR-FIELD COMMUNICATION RECEIVER

CROSS-REFERENCE TO RELATED APPLICATIONS

This application claims priority under 35 U.S.C. § 119 to European Patent Application No. 19189656.2, filed on Aug. 1, 2019, the contents of which are incorporated by reference herein.

TECHNICAL AREA

The invention relates to a method for sensitivity control in a near-field communication device operating in the receiving mode, to a near-field communication device operating in the receiving mode configured to have a controllable sensitivity, and to a machine-readable non-transitional storage medium storing a computer program product, or a computer program product comprising instructions, which are configured to control or execute the method.

BACKGROUND TO THE INVENTION

Near-field communication (herein: NFC) is an international transmission standard, which is based on radio-frequency identification (RFID) technology, for contactless exchange of data by electromagnetic induction by means of loosely coupled antenna coils via short distances of a few centimeter and a data transmission rate of normally at up to 848 kBit/s. Until now, this technology is used primarily in the area of micropayment—contactless payment of small (monetary) amounts, and also in the areas of fare collection and car access systems using e.g. dedicated key tokens or smartphones, having NFC functionality.

FIG. 11 shows a conventional NFC arrangement 1100 comprising a polling NFC device 1110, such as for example a card reader, and a listening NFC device 1150, which is sometimes referred to as a tag, such as for example a smart card, a smartphone, or a tablet having NFC functionality.

When a listening NFC device 1150 enters in a coupling range of a polling NFC device 1110, the polling NFC device 1110 and the listening NFC device 1150 establish a coupling 1140 in respect of the exchange of data. The polling NFC device 1110, which is by default in a transmitting mode, may transmit commands and data (not shown), including requests for data. The listening NFC device 1150, which is by default in a transmitting mode, receives these commands and data in the receiving mode, processes them, switches temporarily to a transmitting mode, and may transmits the requested data (not shown) for receipt by the polling NFC device 1110. The polling NFC device 1110 switches temporarily to a receiving mode, and may receive the data transmitted by the listening NFC device 1150.

In order to provide such functionality, the polling NFC device 1110 comprises an NFC device 1120, which in turn comprises a receiver 1122, a processing unit 1124, and a transmitter 1126; an antenna interface 1128; and an antenna coil 1130. When the polling NFC device 1110 is in the transmitting mode, the signal flow proceeds from the processing unit 1124 to the transmitter 1126 via a data path 1134, further from the transmitter 1126 to the antenna interface 1128 via a data path 1135, further from the antenna interface 1128 to the antenna coil 1130 via a data path 1136, and then from the antenna coil 1130 as a transmitted RF signal (not shown) into the air. When the polling NFC device 1110 is in the receiving mode, the signal flow proceeds from an RF signal (not shown) received by the antenna coil 1130, from the antenna coil 1130 to the antenna interface 1128 via a data path 1131, further from the antenna interface 1128 to the receiver 1122 via a data path 1132, and further from the receiver 1122 to the processing unit 1124 via a data path 1133.

Similarly, the listening NFC device 1150 comprises an NFC device 1160, which in turn comprises a receiver 1162, a processing unit 1164, and a transmitter 1166; an antenna interface 1168; and an antenna coil 1170. When the listening NFC device 1150 is in the receiving mode, the signal flow proceeds from an RF signal (not shown) received by the antenna coil 1170, from the antenna coil 1170 to the antenna interface 1168 via a data path 1171, further from the antenna interface 1168 to the receiver 1162 via a data path 1172, and further from the receiver 1162 to the processing unit 1164 via a data path 1173. When the listening NFC device 1110 is in the transmitting mode, the signal flow proceeds from the processing unit 1164 to the transmitter 1166 via a data path 1174, further from the transmitter 1166 to the antenna interface 1168 via a data path 1175, further from the antenna interface 1168 to the antenna coil 1170 via a data path 1176, and then from the antenna coil 1170 as a transmitted RF signal (not shown) into the air.

Thus far, the NFC arrangement 1100 is "symmetrical" in the sense that the polling NFC device 1110 is configured and capable to transmit data to a listening NFC device 1150, and is configured and capable to receive data from a listening NFC device 1150, via the coupling 1140, and further that the listening NFC device 1150 is configured and capable to transmit data to a polling NFC device 1110, and is configured and capable to receive data from a polling NFC device 1110, also via the coupling 1140.

The listening NFC device 1150 may be a portable device, namely for example a smart card or a smartphone having NFC functionality as explained above, while the polling NFC device 1110 may be a stationary device, such as for example a card reader (wherein the expression "reader" refers to the capability of the card reader to read out portable-device-specific data from the portable device).

NFC communication is normally initiated by the polling NFC device 1110, e.g. the reader, and after successful reception, the listening NFC device 1150, e.g. the tag, will respond with a corresponding answer. The listening NFC device 1150 will respond with active or passive load modulation techniques. Normally, both devices 1110 and 1150 are arbitrary displaced in a proximity volume of a couple of centimeters, leading to an arbitrary coupling 1140 between the antennas 1130, 1170 of the devices 1110, 1150. Hence, arbitrary signal levels will be seen in the reader 1162 of the listening NFC device 1150 and/or in the reader 1122 of the polling NFC device 1110, when the device 1110, 1150 is in the receiving mode.

NFC technology, according to its lifecycle, is starting to develop to cost reduction rather than feature increase. By consequence, this means also that the infrastructure is getting cost-reduced, and this occurs at least in part on the cost of equipment and communication link quality. Therefore, the equipment is required to work robustly even in a disturbed environment.

In this NFC technology development environment, the present invention is directed to improve the robustness of an NFC communication device operating in its receiving mode, in particular to improve the sensitivity of an NFC receiver in terms of the reliability to detect even small nominal signals and to discriminate nominal signals against the noise floor.

For example, in a cheap and accordingly technically simple NFC reader, the noise that is produced on a detected field envelope signal may disturb the receiver in case the receiver sensitivity is set too high. This may lead to false detections, and to long firmware recovery periods that may have to be executed in order to reset the device, which may even become noticeable by a user.

SUMMARY OF THE INVENTION

The present invention relates to NFC devices operating as a listening NFC device in the receiving mode.

It is a general object of the present invention to provide a method for operating an NFC communication device, such as a mobile communication device or a smart card, that operates in the receiving mode with improved sensitivity in respect of the capability to detect nominal signals, and in particular with a more robust capability to discriminate nominal signals against the noise floor.

This object is solved by the subjects having the features according to the independent patent claims. In particular, this object is solved by a method for sensitivity control in a near-field communication device operating in the receiving mode according to the appended independent claim 1, by a near-field communication device configured to have a controllable sensitivity according to the appended independent claim 9, and to a machine-readable non-transitional storage medium storing a computer program product, or a computer program product as such, comprising instructions that are configured to control or execute the method, according to the appended independent claim 15. Further embodiment examples of the invention are described in the dependent claims.

According to a first exemplary embodiment of the present invention, there is provided a method for sensitivity control in a near-field communication, NFC, device operating as a listening NFC device in a receiving mode. The method has the following steps:

a.i) determining a current received signal strength indicator, RSSI, value as a function of the digital signal output, I, of an I-channel, and the digital signal output, Q, of a Q-channel, of an I&Q demodulating block;

b) combining the digital signal output of the I-channel, and the digital signal output of the Q-channel, using an I&Q channel combiner unit, to yield a combined digital output signal, S, for example according to $S=\sqrt{(I^2+Q^2)}$;

c) generating a first time-derivative signal, which is indicative for a derivation with respect to time of the combined digital output signal, as a filter output, from a first differential filter unit that receives the combined digital output signal as input;

d) calculating a threshold value, using a threshold value calculating unit, as a function of the determined current RSSI value, and e) applying the calculated threshold value as a threshold parameter to a threshold comparison unit, which is configured to receive the first time-derivative signal as input, to compare the first time-derivative signal with the applied threshold parameter, and to provide a binary output that is indicative of whether the input first time-derivative signal is greater than the applied threshold parameter or not.

By determining the RSSI value as a function of the digital signal output of the I-channel and of the digital signal output of the Q-channel, the RSSI can be determined dynamically. On this basis, by calculating the threshold value as a function of the determined current RSSI value, also the threshold value can be calculated, and e.g. updated, dynamically. Then, by applying the calculated threshold value as a threshold parameter to the threshold comparison unit, e.g. in a signal processing process, for comparison with the signal to be evaluated, here the first time-derivative signal of the combined digital output signal from the I&Q channel combiner unit, the sensitivity of the signal processing can be adjusted dynamically. Hence, the sensitivity can be improved in respect of the capability to detect nominal signals, and the capability of the signal processing to discriminate nominal signals against the noise floor can become more robust.

In the context of the present application, the terms "RSSI" and "RSSI value" refer to the conventionally known "Received Signal Strength Indicator" and its value. The conventionally known RSSI value refers to an amplitude, which is given by the amplitudes of the analogue digital converter of the I-channel (ADC-I) and the analogue digital converter of the Q-channel (ADC-Q), multiplied by the current gain control value (GC) that is applied to the baseband amplifier of the I-channel and the baseband amplifier of the Q-channel, in particular according to:

$$RSSI=sqrt((ADC\text{-}I)^2+(ADC\text{-}Q)^2)*GC.$$

The dynamical calculation and adjustment of the threshold, according to the present invention, here is to be distinguished against a static threshold determination and setting, i.e. static implementations, which are known in conventional designs of NFC devices, in particular NFC receivers. The dynamical alignment calculation and adjustment of the threshold, according to the present invention, may be event-based. For example: the calculation and adjustment of the threshold, according to the invention, may be performed according to an event of an RSSI value readout and an event of a GC value readout.

In operation of an NFC receiver, the calculation and adjustment of the threshold may be performed in particular:
1. after a detection by the reader of an RF field, to which the reader is exposed,
2. if the NFC reader is part of an NFC device that is capable to switch between a receiving mode and a transmitting mode, the calculation and adjustment of the threshold may be performed immediately before, or after, the switching to the transmitting mode and a related data transmission by the NFC device, or
3. with a configurable period during a reception wait time, in particular a default period, for example of 10 ms.

In an embodiment example of the method, the method may further have:

a.ii) determining a current gain control, GC, value as a function of the digital signal output of the I channel, and the digital signal output of the Q channel, wherein the GC value is configured to be applied as an amplifier gain parameter both to an I-channel amplifier connected upstream of an I-channel analogue digital converter in the I-channel and to a Q-channel amplifier connected upstream of a Q-channel analogue digital converter in the Q-channel, and step d) may comprise calculating the threshold value, using the threshold value calculating unit, as a function of the determined current RSSI value and of the determined current GC value.

By calculating the threshold value as a function of both the determined current RSSI value and the determined current GC value, the threshold comparison can be compensated for adjustments of an adjustable gain of a baseband amplifier of the I-channel and an adjustable gain of a baseband amplifier of the Q-channel, which gain adjustments may be made using the, e.g. dynamically, determined GC value.

In an embodiment example of the method, the GC value may attain only discrete values, in particular may attain the values 18 dB, 12 dB, 6 bB, 0 dB, and −6 dB (which values are related to some particular powers of two, viz. $2^4$=16, $2^3$=8, $2^2$=4, $2^1$=2, and $2^0$=1).

In the context of the present application, the terms "GC" and "GC value" refer to the conventionally known "Gain Control" parameter and its value. Methods and systems for determining the conventionally known "Gain Control" parameter are disclosed for example in the European patent application no. EP 18306752, which has been filed on 19 Dec. 2018 by the Applicant of the present application, and which is entitled "Method and system for gain control in a communications system", which is incorporated herein by reference in its entirety.

In an embodiment example of the method, step d) may comprise calculating the threshold value, using the threshold value calculating unit, as a function of the determined current RSSI value, of the determined current GC value, and of a margin value, M, which is indicative for the difference between an initial threshold value and a noise floor value associated with the generated first time-derivative signal.

In an embodiment example of the method, the threshold value may be calculated as a function of the RSSI value and a margin value, M. This can be expressed mathematically as follows:

$$\text{THLD}=f(\text{RSSI},M). \qquad (1)$$

Herein, the margin M may be calculated, in particular for example during a calibration procedure, as a function of a confidence value, δ, and a particular decoder technology, which is related to a normalized data pattern, namely a so-called signal pattern, so that the margin calculation can be expressed mathematically as:

$$M=f(\delta,\text{signal pattern}). \qquad (2)$$

In another embodiment example of the method, the threshold value may be calculated according to:

$$\text{THLD}=M^*\text{RSSI}/\text{GC}, \qquad (3)$$

wherein THLD is the calculated threshold value, M is the margin value, RSSI is the determined current RSSI value, and GC is the current gain control value.

In an embodiment example of the method, the margin value may be a product-specific parameter, which may be stored in a non-volatile memory of the NFC device, and which may be determined in a calibration procedure performed after the manufacture of the NFC device and before delivery of the NFC device and/or the building-in of the NFC device in a communication device, such as a smart phone, a tablet, or a smart card.

In an embodiment example of the method, the margin value may be determined, in a calibration procedure, as a function of each one of the following:
 1) a type of a communication signal interface, which may be associated with the NFC device;
 2) a bitrate of the combined digital output signal;
 3) a confidence level.

In a particular embodiment example of the method, the type of a communication signal interface may in particular be associated with one of:
 i) type A, as specified in ISO 14443-2-A/NFCForum specifications,
 ii) type B, as specified in ISO 14443-2-B/NFCForum specifications,
 iii) type F, as specified in FeliCa protocol/NFCForum Analogue specifications.

In a particular embodiment example of the method, the bitrate of the combined digital output signal may be in particular one of:
 i) for an A-type communication signal interface, a bitrate, in kbps, of one of 106, 212, 424, and 848,
 ii) for an B-type communication signal interface, a bitrate, in kbps, of one of 106, 212, 424, and 848,
 iii) for an F-type communication signal interface, a bitrate, in kbps, of one of 212 and 424.

In a particular embodiment example of the method, the confidence level may be a product-specific parameter, which may be stored in a non-volatile memory of the NFC device. The confidence level may be determined in a calibration procedure performed after the manufacture of the NFC device and before delivery of the NFC device and/or the building-in of the NFC device in a communication device, such as a smart phone, a tablet, or a smart card, and which may represent a ratio of a threshold value determined in the calibration and a filter gain of the first differential filter unit.

In a more particular embodiment example of the method, the confidence level may in particular be determined to be between 20% and 90%, more particular between 30% and 80%, more in particular between 40% and 70%, and still more particular to be 60%.

In an embodiment example of the method, the margin value, M, may be determined for a plurality of combinations of type of a communication signal interface and bitrate.

In a particular embodiment example of the method, the margin level may be determined in particular for each one of the following combinations of type of a communication signal interface and bitrate:
 i) A-106, A-212, A-424, A-848,
 ii) B-106, B-212, B-424, B-848, and
 iii) F-212, F-424.

Herein, an ISO 14443-2 signal pattern or Felica standard signal pattern may be associated to each of the specified combinations, which pattern may specify, for each one of a predetermined plurality of signal pattern conditions, an associated gain of the first differential filter unit.

In a more particular embodiment example of the method, the margin value, M, may be determined with respect to the first differential filter unit gain of that signal pattern condition, to which the lowest first differential filter unit gain may be associated.

In an embodiment example of the method, if an RF field external to the NFC device has a detected field strength that is below a pre-determined minimum threshold field strength, a decoder that is connected, in a signal processing path, downstream of the threshold comparison unit is disabled and/or the threshold value applied to the threshold comparison unit is set to a maximum value.

According to a second exemplary embodiment example of the present invention, there is provided a near-field communication, NFC, device configured to have a controllable sensitivity. The NFC device has:
 an I&Q demodulating block having an I-channel and a Q-channel, wherein the I-channel is configured to output a digital I-channel signal output, I, and the Q-channel is configured to output a digital Q-channel signal output, Q;
 an I&Q channel combiner unit having an input configured to receive the digital I-channel signal output, an input configured to receive the digital Q-channel signal output, and an output configured to output a combined digital output signal, S, that is determined as a function of the digital I-channel signal output and the digital Q-channel signal output, for example according to $S=\sqrt{(I^2+Q^2)}$;

a received signal strength indicator, RSSI, measurement unit configured to receive the digital signal output of the I-channel and the digital signal output of the Q-channel, and to determine a current received signal strength indicator, RSSI, value as a function of the digital signal output of the I-channel and the digital signal output of the Q-channel;

a first differential filter unit, which is configured to receive the combined digital output signal as input and to generate a first time-derivative signal, which is indicative for a derivation with respect to time of the combined digital output signal, as a filter output;

a threshold value calculating unit, which is configured to receive the determined current RSSI value and to calculate a threshold value as a function of the determined current RSSI value and to provide the calculated threshold value as output; and a threshold comparison unit, which is configured to receive the first time-derivative signal as input, to receive the calculated threshold value as an applied threshold parameter, to compare the first time-derivative signal with the applied threshold parameter, and to provide a binary output that is indicative of whether the input first time-derivative signal is greater than the applied threshold parameter or not.

The NFC device according to the second exemplary embodiment example of the present invention has the same advantages as those that are explained above in relation with the method according to the first exemplary embodiment example of the present invention.

In an embodiment example of the NFC device, the NFC device may further have:
  a gain control, GC, value determining unit, which may be configured to receive the digital signal output of the I channel, and the digital signal output of the Q channel, as inputs, and to determine a current gain control, GC, value as a function of the digital signal output of the I channel, and the digital signal output of the Q channel,
  wherein the GC value may be configured to be applied as an amplifier gain parameter both to an I-channel amplifier connected upstream of an I-channel analogue digital converter in the I-channel and to a Q-channel amplifier connected upstream of a Q-channel analogue digital converter in the Q-channel, and
  wherein the threshold value calculating unit may be configured to receive the determined current RSSI value and the determined current GC value as inputs, and to calculate the threshold value as a function of the determined current RSSI value and of the determined current GC value.

In an embodiment example of the NFC device, the threshold value calculating unit may be configured to calculate the threshold value as a function of the determined current RSSI value, of the determined current GC value, and of a margin value, M, which is indicative for the difference between an initial threshold value and a noise floor value associated with the generated first time-derivative signal.

In an embodiment example of the NFC device, the threshold value may be calculated as a function of the RSSI value and a margin value, M. This can be expressed mathematically as follows:

$$\text{THLD}=f(\text{RSSI}, M). \tag{1}$$

Herein, the margin M may be calculated, in particular for example during a calibration procedure, as a function of a confidence value, δ, and a particular decoder technology, which is related to a normalized data pattern, namely a so-called signal pattern, so that the margin calculation can be expressed mathematically as:

$$M=f(\delta, \text{signal pattern}). \tag{2}$$

In another embodiment example of the NFC device, the threshold value may be calculated according to:

$$\text{THLD}=M*\text{RSSI}/GC, \tag{3}$$

wherein THLD is the calculated threshold value, M is the margin value, RSSI is the determined current RSSI value, and GC is the current gain control value.

In an embodiment example of the NFC device, the margin value is a product-specific parameter, which may be stored in a non-volatile memory of the NFC device. The margin value may be determined in a calibration procedure performed after the manufacture of the NFC device and before delivery of the NFC device and/or the building-in of the NFC device in a communication device, such as a smart phone, a tablet, or a smart card.

In an embodiment example of the NFC device, the NFC device may further comprise an RSSI value register configured to store a value that is indicative for the determined current RSSI value and to provide the stored value to the threshold value calculation unit.

Alternatively or in addition, the NFC device may further comprise a GC value register configured to store a value that is indicative for the determined current GC value and to provide the stored value to the threshold value calculation unit.

Still alternatively or in addition, the NFC device may further comprise a non-volatile storage device configured to store a margin value and/or configured to store a confidence level.

In an embodiment example of the NFC device, the NFC device may further comprise:
  a decoder that may be connected, in a signal processing path, downstream of the threshold comparison unit,
  an external RF field presence detection unit that may be configured to detect if an RF field external to the NFC device has a detected field strength that is below a pre-determined minimum threshold field strength.

Herein, the NFC device may be configured to disable the decoder and/or to set the threshold value applied to the threshold comparison unit to a maximum value, if the detected field strength is below the pre-determined minimum threshold field strength.

According to a third exemplary embodiment example of the present invention, there is provided a machine-readable non-transitional storage medium storing a computer program product, or a computer program product comprising instructions, which control or execute the method according to the first exemplary embodiment example of the present invention, when run on a data processing system, such as a processor, a micro-processor, or a computer.

BRIEF DESCRIPTION OF THE DRAWINGS

In the following, exemplary embodiment examples of the present invention are described in detail with reference to the following drawings.

FIG. 2A shows a schematic block diagram of a conventional linear receiver, of an NFC device, having an RSSI measurement unit, a GC value determining unit, and a conventional static threshold value setting unit.

FIG. 2B shows a schematic block diagram of a linear receiver, of an NFC device, having an RSSI measurement unit, a GC value determining unit, and a dynamic threshold value calculating unit coupled to the RSSI measurement unit and the GC value determining unit, according to an exemplifying embodiment of the present invention.

FIG. 6A shows an exemplary measured timing diagram of a signal present in the signal processing block during operation of a receiver, namely a timing diagram of a combined digital output signal, S, as output from the I&Q channel combiner unit and as input to the first differential filter.

FIG. 6B shows an exemplary measured timing diagram of two signals present in the signal processing block during operation of a receiver, namely a timing diagram of the absolute value of a first time-derivative signal as output from the first differential filter, and a timing diagram of a conventional threshold value signal, as applied by a conventional static threshold value setting unit, to a threshold parameter input of a threshold comparison unit in FIG. 3A.

FIG. 6C shows an exemplary measured timing diagram of a signal present in the signal processing block during operation of a receiver, namely a timing diagram of the output of a conventional edge detection filter using the conventional threshold value signal shown in FIG. 6B as the threshold parameter input of the threshold comparison unit in FIG. 3A.

FIG. 6D shows an exemplary measured timing diagram of two signals present in the signal processing block during operation of a receiver, namely a timing diagram of the absolute value of a first time-derivative signal as output from the first differential filter, and a timing diagram of a dynamically calculated threshold value signal, as applied by a threshold calculation unit according to the invention, to a threshold parameter input of a threshold comparison unit in FIG. 3B, according to an exemplifying embodiment of the present invention.

FIG. 6E shows an exemplary measured timing diagram of a signal present in the signal processing block of FIGS. 2B and 3B during operation of a receiver, namely a timing diagram of the output of an edge detection filter using the dynamically calculated threshold value signal according to the invention and shown in FIG. 6D as the threshold parameter input of the threshold comparison unit in FIG. 3B, according to an exemplifying embodiment of the present invention.

FIG. 6F shows an exemplary measured timing diagram of two signals present in the signal processing block during operation of a receiver, namely a timing diagram of a combined digital output signal, S, as output from the channel combiner unit and as input to the first differential filter in FIG. 3B (lower curve), and a timing diagram of the associated absolute value of the first time-derivative signal as output from the first differential filter in FIG. 3B (upper curve), and illustrating a dynamically calculated threshold value, according to an exemplifying embodiment of the present invention.

FIG. 8A shows, for a combination of a communication signal interface of A-type and a bitrate of 106 kbps, a diagram of an associated ISO 14443-2 signal pattern, which specifies, for each one of a predetermined plurality of pattern conditions, an associated gain of the first differential filter (or "filter gain"), and wherein the following pattern-specific quantities are indicated: i) that pattern number, to which the lowest first differential filter gain is associated, ii) the associated lowest first differential filter gain, iii) a threshold value determined during a calibration procedure as a function of the associated lowest first differential filter gain by applying a confidence level of 60%, iv) a corresponding threshold value determined during the calibration and configured advantageously for implementation, and v) a noise floor.

FIG. 8B is a diagram similar to that of FIG. 8A, which indicates the same types of pattern-specific quantities, though for an ISO 14443-2 signal pattern that is associated with a combination of a communication signal interface of A-type and a bitrate of 212 kbps.

FIG. 8E is a diagram similar to that of FIG. 8A, which indicates the same types of pattern-specific quantities, though for an ISO 14443-2 signal pattern that is associated with a combination of a communication signal interface of B-type and a bitrate of 106 kbps.

FIG. 8F is a diagram similar to that of FIG. 8A, which indicates the same types of pattern-specific quantities, though for an ISO 14443-2 signal pattern that is associated with a combination of a communication signal interface of B-type and a bitrate of 212 kbps.

FIG. 8I is a diagram similar to that of FIG. 8A, which indicates the same types of pattern-specific quantities, though for a FeliCa signal pattern that is associated with a combination of a communication signal interface of F-type and a bitrate of 212 kbps.

FIG. 8J is a diagram similar to that of FIG. 8A, which indicates the same types of pattern-specific quantities, though for a FeliCa signal pattern that is associated with a combination of a communication signal interface of F-type and a bitrate of 424 kbps.

FIG. 8K shows a table, in which the pattern-specific quantities that are indicated in FIGS. 8A to 8J for the different communication signal interface combinations are summarized.

Figure 1:
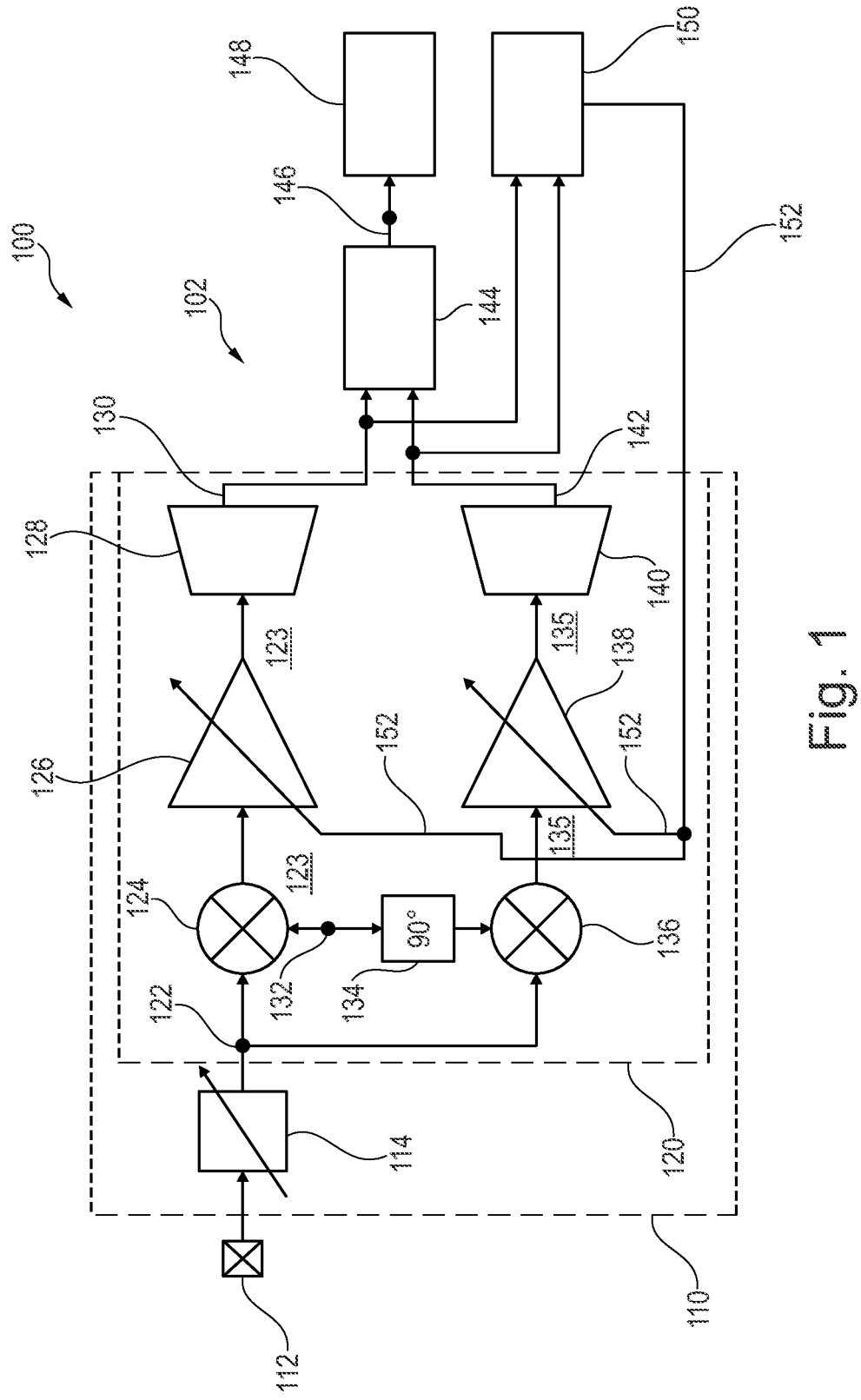
FIG. 1 shows a schematic block diagram of a conventional linear receiver, of an NFC device, having analogue and digital components.

For reasons of conciseness, features, which will be described with respect a particular figure, may not be described again, if they appear likewise or similarly in another figure.

DETAILED DESCRIPTION OF PREFERRED EMBODIMENTS

Before exemplary embodiment examples of the invention are described with reference to the figures, some general aspects of the invention as proposed by the present inventors shall still be explained.

According to the invention, there is provided a new approach for dynamically adjusting the sensitivity of the signal processing circuits in a listening NFC device by determining a threshold value, for example in a signal edge detection filter, as function of the strength of the signal, such as for example the analogue RF field strength to which the NFC device is exposed, or a digital value obtained in the signal processing chain as a measure of the field strength.

Conventional NFC devices having receiving mode capability already provide a parameter that can be used as a measure for the field strength, namely the conventionally known, so-called received signal strength indicator, RSSI.

A basic aspect of the present invention is the approach to dynamically align or adjust the Rx sensitivity of a listening NFC device 1150 operating in the receiving mode, in particular in a card emulation mode, to the external RF field strength, as measured by the RSSI value.

When an external RF field is detected, i.e. an NFC level detector triggers, firmware reads out an RSSI value and uses it to determine the sensitivity, by determining a threshold value in the signal processing chain, for example a threshold value applied in a level detector, as a function of the RSSI value.

The RSSI value may be compensated with a gain that is applied in a signal amplifier upstream in the signal processing chain of the level detector, for example a gain value that is applied to baseband amplifiers that are present in an I-channel and Q-channel of an I&Q demodulation block or an I&Q analogue front end circuit, for example a baseband amplifier gain (herein also referred to as a gain control (GC) value of the baseband amplifier). Systems and methods for amplifier gain control in a signal processing chain of an NFC device are known; a corresponding patent application has been filed by the Applicant of the present application, namely European patent application no. EP 18306752 filed on 19 Dec. 2018 and entitled "Method and System for Gain Control in a Communications Device", which is incorporated herein be reference in its entirety.

By such signal-strength dependent threshold setting, events of detected RF field strength changes can better be coped with by dynamically adjusting the sensitivity to the changed field strength, which may be implemented by adjusting a threshold value in the signal processing chain.

The dynamical adjustment of the sensitivity, implemented according to the present invention by a dynamic calculation and adjustment of the threshold, is to be distinguished against the conventionally used static threshold determination and setting, i.e. static implementation of edge detection, which are known in conventional designs of NFC receivers.

The dynamical alignment calculation and adjustment of the threshold, according to the present invention, may be event-based. For example: the calculation and adjustment of the threshold, according to the invention, may be performed according to an event of an RSSI value readout and an event of a GC value readout.

Moreover, the dynamic calculation and adjustment of the threshold may be performed, in operation of an NFC receiver, in particular upon the following events:

1. After a detection by the reader of an RF field, to which the reader is exposed.
2. If the NFC reader is part of an NFC device that is capable to switch between a receiving mode and a transmitting mode, the calculation and adjustment of the threshold may be performed after switching to the transmitting mode and a related data transmission by the NFC device.
3. With a configurable period during a reception wait time, in particular a default period, for example of 10 ms.

FIG. 1 shows a schematic block diagram of a conventional linear receiver 102, of an NFC device 100, having analogue and digital components.

The NFC receiver device 102 of the NFC device 100 in FIG. 1 comprises an analogue front end 110, which has an input port 112 for an analogue RX signal, and a digital I-channel signal output 130, I, of an I-channel 123 of an I&Q demodulating block 120 and a digital Q-channel signal output 142, Q, of a Q-channel 135 of the I&Q demodulating block 120.

The analogue front end 110 comprises an adjustable high-frequency (or radio frequency, RF) attenuator 114, which receives an analogue RX signal applied at the input port 112 and is configured to attenuate, with an adjustable attenuation, the received signal, and to provide the attenuated high frequency signal as an output.

The output of the high-frequency attenuator 114 is applied to an input of an I&Q demodulating block 120. The I&Q demodulating block 120 comprises input branching node 122, which receives the output from high-frequency attenuator 114 and divides the signal in two branches, or channels, namely in a conventional manner to an I-channel 123 (in-phase channel) and to a Q-channel 135 (quadrature channel) of an I&Q demodulator.

The I-channel 123 comprises a signal processing chain consisting, in this sequence, of an I-channel mixer 124, an I-channel baseband amplifier 126, and an I-channel analogue digital converter 128. The I-channel mixer 124 further receives a continuous wave high-frequency signal 132, which serves as a reference for a frequency and a phase of the passband, mixes the signal applied at the input branching node 122 with the continuous wave high-frequency signal 132, and provides a down-mixed low-frequency signal in the I-channel. The I-channel baseband amplifier 126 receives the down-mixed low-frequency signal in the I-channel as input, amplifies the input signal using an adjustable gain, and provides the amplified signal as an output. The analogue digital converter 128 of the I-channel receives the amplified signal as an analogue input, and provides an according digital signal at its output, as the digital I-channel signal output 130, I.

The I&Q demodulating block 120 further comprises a 90° phase shifter 134, which receives the signal applied at the input branching node 122, applies a phase shift of 90°, and outputs a phase-shifted signal as an input to the Q-channel 135.

The Q-channel 135 is composed similarly as the I-channel 123, and as such comprises a signal processing chain consisting, in this sequence, of a Q-channel mixer 136, a Q-channel baseband amplifier 138, and a Q-channel analogue digital converter 140. The Q-channel mixer 136 further receives the phase-shifted continuous wave high-frequency (i.e. baseband) signal 132, which serves as a reference for the frequency and phase of the passband for the Q-channel, mixes the signal applied at the input branching node 122 with the phase-shifted signal output from the phase shifter 134, and provides a down-mixed low-frequency signal in the Q-channel. The Q-channel baseband amplifier 138 receives the down-mixed low-frequency signal in the Q-channel as input, amplifies the input signal using an adjustable gain, and provides the amplified signal as an output. It is noted that The Q-channel baseband amplifier 138 uses the same adjustable gain as the I-channel baseband amplifier 126. The analogue digital converter 140 of the Q-channel receives the amplified signal as an analogue input, and provides an according digital signal at its output, as the digital Q-channel signal output 142, Q.

The NFC receiver device 102 of the NFC device 100 in FIG. 1 further comprises, in the signal processing chain downstream of the front-end 110 respectively the I&Q demodulating block 120, an I&Q channel combiner unit 144, which receives both the digital I-channel signal output 130, I and the digital Q-channel signal output 142, Q as inputs, and provides at its output a combined digital output signal, S, 146; a signal processing block 148, which receives the combined digital output signal, S, 146 as its input, and a gain control block 150, which—like the I&Q channel combiner unit 144—receives both the digital I-channel signal output 130, I and the digital Q-channel signal output 142, Q as its inputs and provides a gain control value 152 at its output. The gain control value 152 is fed-back to and used by both the I-channel baseband amplifier 126 and the Q-channel baseband amplifier 138.

FIG. 2A shows a schematic block diagram of a conventional linear receiver, of an NFC device 100, 200, having an RSSI measurement unit 256, a GC value determining unit 254, and a conventional static threshold value setting unit 258.

The linear receiver of the NFC device 100, 200 is constructed similarly and/or identically to the linear receiver 102 of the NFC device 100 shown in FIG. 1. In particular, the linear receiver of FIG. 2 comprises an I&Q demodulating block 220, which is similar to the I&Q demodulating block 110, and which comprises an I-channel 223, which is similar to the I-channel 123, and a Q-channel 235, which is similar to the Q-channel 135. The I-channel 223 comprises an I-channel mixer 223, an I-channel baseband amplifier 226, and an I-channel analogue digital converter 228, all of which are connected as the corresponding elements 124, 126, 128 of the I-channel 123 of the I&Q demodulating block 120 shown in FIG. 1. The Q-channel 235 comprises a Q-channel mixer 236, a Q-channel baseband amplifier 238, and a Q-channel analogue digital converter 240, all of which are connected as the corresponding elements 136, 138, 140 of the Q-channel 135 of the I&Q demodulating block 120 shown in FIG. 1.

The linear receiver of the NFC device 100, 200 further comprises an I&Q channel combiner unit 244, which is functions and is connected similar as the I&Q channel combiner unit 144 shown in FIG. 1.

The linear receiver of the NFC device 100, 200 further comprises a received signal strength indicator, RSSI, measurement unit 256, as is conventionally known.

The linear receiver of the NFC device 100, 200 further comprises a GC value determining unit 254. In slight deviation from the gain control block 150 shown in FIG. 1, the GC value determining unit 254 receives the same signals as the channel combiner unit 244, and the RSSI measurement unit 256.

Namely, as shown in FIG. 2, each of the I&Q channel combiner unit 244, the RSSI measurement unit 256, and GC value determining unit 254 receive both the digital I-channel signal output 230, I and the digital Q-channel signal output 242, Q as inputs.

Figure 3A:
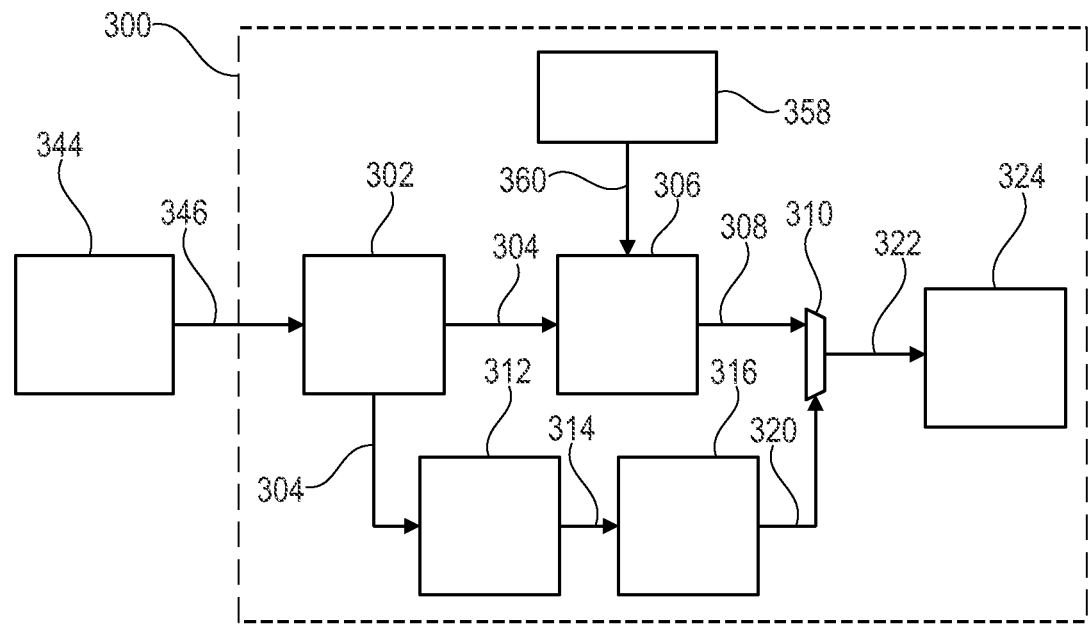
FIG. 3A shows a schematic block diagram of a conventional signal processing block of a conventional linear receiver, wherein the signal processing block has a conventional static threshold value setting unit.
Figure 3B:
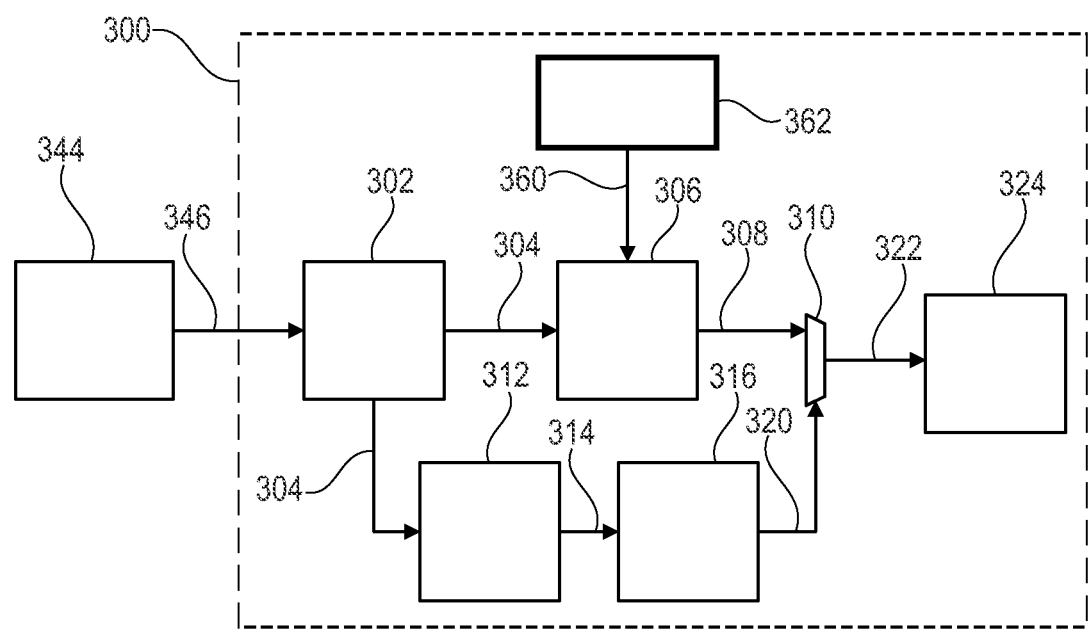
FIG. 3B shows a schematic block diagram of a signal processing block of a linear receiver, wherein the signal processing block has a dynamic threshold value calculating unit, according to an exemplifying embodiment of the present invention.

The I&Q channel combiner unit 244 provides at its output a combined digital output signal (not shown in FIG. 2), similarly as in FIG. 1, which is then further processed as is shown in FIGS. 3A and 3B in respect of the I&Q channel combiner unit 344.

The RSSI measurement unit 256 provides at its output an RSSI value 264, which is indicative of the current RSSI, which corresponds to the currently detectable RF field strength.

The GC value determining unit 254 provides at its output a GC value 252 and a GC value 266, which are identical or proportional to each other, and which are indicative of a currently applicable GC value 152, 252, which may or is to be applied to the I-channel and Q-channel baseband amplifiers 126, 226, 138, 238.

As can be seen in FIG. 2, the NFC device 200 comprises, in the signal processing chain downstream of the I&Q channel combiner unit 244, a signal processing block 248, which receives, as its input, the combined digital output signal, S, as provided by the I&Q channel combiner unit 244, and, as a static parameter, a threshold value 260, which is provided by a static, conventional threshold value setting unit 258. The conventional threshold value setting unit 258 may be implemented as, or may comprise a register, which stores the threshold value 260 to be applied, as a parameter, to the signal processing block 248. The signal processing block 248 may comprise an edge detection filter, which uses the, in FIG. 2A static, threshold value 260 for comparison with a signal to be processed, in order to discriminate whether the signal is above the threshold, which is then taken to be indicative for the signal being a nominal signal above the noise level, or whether the signal is below the threshold, which is then taken to be indicative for a signal considered to belong to the noise level.

FIG. 2B shows a schematic block diagram of a linear receiver, of an NFC device 200, according to the invention and having an RSSI measurement unit 256, a GC value determining unit 254, and a dynamic threshold value calculating unit 262 coupled to the RSSI measurement unit 256 and the GC value determining unit 254, according to an exemplifying embodiment of the present invention.

The receiver of the NFC device 200 shown in FIG. 2B differs from the conventional receiver of the NFC device 200 shown in FIG. 2A in that the static, conventional threshold value setting unit 258 is replaced by a dynamic threshold value calculating unit 262 according to the present invention.

The receiver according to the invention in FIG. 2B further differs from the conventional receiver in FIG. 2A in that it has an RSSI measurement unit 256 and an RSSI value register 257. The RSSI measurement unit 256 is configured to receive the digital signal output 230 of the I-channel 223 and the digital signal output 242 of the Q-channel 235, and to determine a current RSSI value 264 as a function of the digital signal output 230 of the I-channel 223 and the digital signal output 242 of the Q-channel 235. The RSSI value register 257 is configured to store a value that is indicative for the determined current RSSI value 264 and to provide the stored value 264 to the dynamic threshold calculation unit 262. The dynamic threshold value calculation unit 262 is configured to receive the determined current RSSI value 264, in particular from the RSSI value register 257, and to calculate a threshold value 260 as a function of the determined current RSSI value 264 and to provide the calculated threshold value 260 as output to the signal processing unit 248.

The receiver according to the invention in FIG. 2B further differs from the conventional receiver in FIG. 2A in that it has a GC value register 255, and in that the GC value determining unit 254 has an output, which is configured to provide a determined GC value to the GC value register 255. The GC value register 255 is configured to store a value that is indicative for the determined current GC value 266 and to provide the stored value to the dynamic threshold value calculation unit 262.

The dynamic threshold value calculating unit 262 receives, as a first input, an RSSI value 264 as provided from the RSSI measurement unit 256, in particular directly or indirectly from the RSSI value register 257, and, optionally, as a second input, a GC value 266 as provided from GC value determining unit 254, in particular directly or indirectly from the GC value register 255. The dynamic threshold value calculating unit 262 is configured to calculate, as a function of the RSSI value 264, and optionally as function of the GC value 266, a dynamic threshold value 260. The dynamic threshold value 260 is thus configured to vary dynamically as a function of the RSSI value 264, and, optionally, as a function of the GC value 266.

The receiver according to the invention in FIG. 2B further differs from the conventional receiver in FIG. 2A in that the signal processing block 248 receives, as a parameter input, the dynamically calculated threshold value 260 (by difference to the conventional static threshold value used in FIG. 2A).

In an embodiment example of the present invention, the threshold value 260 may be calculated by the threshold value calculating unit 262 as a function of the RSSI value 264 and a margin value, M. This can be expressed mathematically as follows:

$$\text{THLD} = f(\text{RSSI}, M). \tag{1}$$

Herein, the margin M may be calculated, in particular for example during a calibration procedure, as a function of a confidence value, δ, and a particular decoder technology, which is related to a normalized data pattern, namely a so-called signal pattern, so that the margin calculation can be expressed mathematically as:

$$M = f(\delta, \text{signal pattern}). \tag{2}$$

Embodiments of the determination of the margin value M according to equation (2) are explained further below with reference to FIGS. 8A to 8K.

In another embodiment example of the present invention, the threshold value may be calculated according to:

$$\text{THLD} = M * \text{RSSI} / \text{GC}. \tag{3}$$

Herein, THLD is the calculated threshold value 260, M is the margin value, RSSI is the determined current RSSI value 264, and GC is the current gain control value 266.

The RSSI value 264 may be expressed as $$\text{RSSI} = K * \text{FS}, \tag{4}$$

wherein FS is the field strength, expressed in mA/m (milliamperes per meter), and K is a transfer ratio from the field strength FS to the combined digital output signal 246, S. Accordingly, and with M representing the margin value, equation (3) can be written as:

$$\text{THLD} = M * K * \text{FS} / \text{GC}. \tag{5}$$

In embodiment examples of the present invention, and as explained further below with reference to FIGS. 8A to 8K, the margin value may be a product-specific parameter. As such, the margin value may belong to a set of system parameters of the product, which may be stored in a non-volatile memory of the NFC device 100, 1120, 1160, and which may be determined in a calibration procedure performed after the manufacture of the NFC device 100, 1120, 1160 and before delivery of the NFC device 100, 1120, 1160 and/or the building-in of the NFC device 1160 in a communication device 1150, such as a smart phone, a tablet, or a smart card.

In respect of the detected RF field strength, in embodiment examples of the present invention, there is a lower limit for the application of the invention in general and for the, in particular dynamic determination of the threshold value as a function of the RSSI value. Namely, if an RF field external to the NFC device 100, 1120, 1160 has a detected field strength that is below a pre-determined minimum threshold field strength (see 722 in FIG. 7), a decoder 324 that is connected, in a signal processing path, downstream of the threshold comparison unit 306, is disabled and/or the threshold value (360 in FIG. 3B) applied to the threshold comparison unit (306 in FIG. 3B) is set to a maximum value so that the detection of real signals is in fact disabled.

FIG. 3A shows a schematic block diagram of a conventional signal processing block 248, 300 of a conventional linear receiver, wherein the signal processing block 248, 300 has a conventional static threshold value setting unit 258, 358.

The signal processing block 300 comprises a first differential filter unit 302, which receives as its input the combined digital output signal, S, 246, 346 from the channel combiner unit 244, 344 (which reflects the level of the outputs 230, 242 of the I-channel and the Q-channel analogue digital converters 228, 240), and provides as its output a first time-derivative signal 304; a second differential filter unit 312, which receives as its input the first time-derivative signal 304 that is output by the first differential filter unit 302; a zero crossing detection unit 316, which receives as its input the second time-derivative signal 314 that is output from the second differential filter unit 312 and provides at its output a zero crossing detection signal 320; a threshold comparison unit 306, which receives as its input the first time-derivative signal 304 output from the first differential filter unit 302 and as a threshold parameter input a static threshold value 260, 360 output from a static, conventional threshold value setting unit 258, 358, and provides as its output a binary output 308; a multiplexer unit 310, which receives as its input the binary output 308 from the threshold comparison unit 306 and as a control parameter input the zero crossing detection signal 320 output from the zero crossing detection unit 316, and provides as its output a so-called envelope signal 322; and a decoder 324, which receives as its input the envelope signal 322 output from the multiplexer unit 310.

The zero crossing detection signal 320, as output from the zero crossing detection unit 316, is a binary signal, which peaks from a "FALSE"-type value, which represents a course of the second time-derivative signal 314 not crossing the zero line, for a predetermined short period in time to a "TRUE"-type value, which represents the course of the second time-derivative signal 314 just having crossed the zero line.

The signal processing block 300 further comprises the static, conventional threshold value setting unit 258, 358, which is configured to provide a static threshold value 260, 360, as has been explained already with reference to FIG. 2A, wherein the static threshold value 260, 360 is input as a static parameter to the threshold comparison unit 306.

FIG. 3B shows a schematic block diagram of a signal processing block 248, 300 of a linear receiver, wherein the signal processing block 248, 300 has a dynamic threshold value calculating unit 262, 362, according to an exemplifying embodiment of the present invention.

The signal processing block 300 of the linear receiver 300 as shown in FIG. 3B differs from the signal processing block 300 of the linear receiver 300 as shown in FIG. 3A in that the static, conventional threshold value setting unit 258, 358 is replaced by a dynamic threshold value calculating unit 258, 358 according to the present invention, in that the dynamic threshold value calculating unit 258, 358 provides a dynamic threshold value 360 according to the present invention, so that the threshold comparison unit 306 receives the dynamic threshold value 360 at its parameter input, and in that the threshold comparison unit 306 compares the first time-derivative signal 304 with a dynamic threshold value 360, thereby implementing a dynamically adjusted sensitivity.

Figure 4:
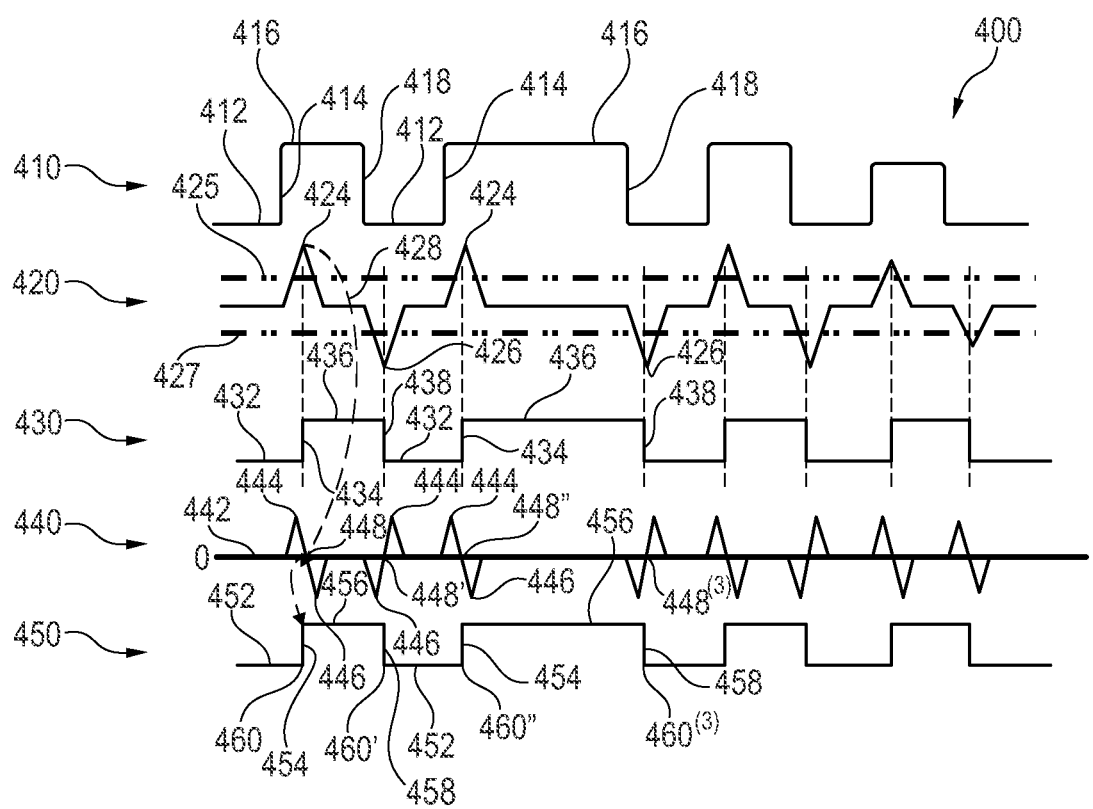
FIG. 4 shows schematic timing diagrams of various signals present in a signal processing block, wherein the signals comprise a combined digital output signal from the channel combiner unit, a first time-derivative signal, a next envelope signal, a second time-derivative signal, and an envelope signal representing a binary output signal to be input in a decoder.

FIG. 4 is a schematic diagram 400, which shows schematic timing diagrams of various signals 410, 420, 430, 440 present in the signal processing block 300 shown in FIG. 3B, wherein the signals 410, 420, 430, 440 comprise a combined digital output signal 410, 346, 246 from the channel combiner unit 244, 344, a first time-derivative signal 420, a next envelope signal 430, a second time-derivative signal 440, and an envelope signal 450 representing a binary output signal to be input in a decoder 324.

The course of the combined digital output signal 410 is a digital signal, which comprises a low level signal 412, a rising edge 414 continuing from the low level signal 412 and rising from the low level signal 412, a high level signal 416 continuing from the raised edge of the rising edge 414, a falling edge 418 continuing from the high level signal 416 and falling down back to the low signal level 412.

As stated already with reference to FIGS. 3A and 3B, the first differential filter unit 302 is configured to receive as its input the combined digital output signal 410 (or 246, 346 as shown in FIGS. 2B, 3B), S (which reflects the level of the outputs 230, 242 of the I-channel and the Q-channel analogue digital converters 228, 240), to perform a filtering operation which is equivalent to determining the first derivative with respect to time of the combined digital output signal 410, 246, 346. The operation of determining the first derivative of the combined digital output signal 410, 216, 316 with respect to time yields the first time-derivative signal 420, 304.

The course of the first time-derivative signal 420, 304 has a zero first derivative signal 422, which continues into a positive peak having a positive maximum 424, wherein the positive peak develops upon the rising edge 414 of the combined digital output signal 410. The positive peak falls back to the level of the zero first derivative signal 422, which then continues into a negative peak having a negative maximum 426, wherein the negative peak develops upon the falling edge 418 of the combined digital output signal 410.

As stated with reference to FIG. 3B, the first time-derivative signal 420 is compared, in the threshold comparison unit 306, with the dynamically determined (positive) threshold value 425, 360, and it is mentioned that the first time-derivative signal 420 is also compared with the dynamically determined (negative of the) threshold value 427, 360. Only if the positive maximum 424 is greater than the positive threshold value 425 and the negative maximum 426 is greater than the (negative) threshold value 427, the threshold comparison unit 306 will output a binary signal 308, which is herein also referred to as the next envelope signal 430, as will be explained hereinafter.

The next envelope signal 430, as stated, is a binary signal, which is the output signal 308 of the threshold comparison unit 306 in FIG. 3B. The next envelope signal 430 changes its level as follows. When the absolute value of the first differential signal 420 rises above the threshold value, the next envelope signal 430 toggles, and the next envelope signal 430 is locked until the next time, when the absolute value of the first differential signal 420 rises above the threshold value. In particular, with reference to FIG. 4, when the first differential signal 420 rises above the positive threshold value 425, the next envelope signal 430 toggles, and via a rising edge 434 starting from a low level next envelope signal 432, assumes a high level next envelope signal 436, and is locked until the next rise of the first differential signal 420 above a threshold. When the first differential signal 420 falls below the negative threshold value 427, the next envelope signal 430 toggles, and via a falling edge 438 starting from the high level next envelope signal 436, assumes a low level next envelope signal 432, and is locked until the next rise of the first differential signal 420 above a threshold.

The course of the second time-derivative signal 440, 314 has a zero second derivative signal 442, which continues to a positive peak 444 having a positive maximum, wherein the positive peak 444 develops upon the rising edge of the positive maximum 424 of the first time-derivative signal 420, continues through a zero crossing (first zero crossing at 448) and further to a negative peak 446 having a negative maximum, wherein the negative peak 446 develops upon the falling edge of the positive maximum 424 of the first time-derivative signal 420. This first zero crossing (at 448) of the second time-derivative signal 440 corresponds, in time, to the positive maximum 424 of the first time-derivative signal 420, as is indicated by the dashed line at 428.

Following the negative peak 446, the second time-derivative signal 440, 314 firstly continues on a level of a zero second derivative signal 442, and then continues to a negative peak 446 having a negative maximum, wherein the negative peak 446 develops upon the falling edge of the negative maximum 426 of the first time-derivative signal 420, continues through a zero crossing (second zero crossing at 448') and further to a positive peak 444 having a positive maximum, wherein the positive peak 444 develops upon the rising edge of the negative maximum 426 of the first time-derivative signal 420. This second zero crossing (at 448') of the second time-derivative signal 440 corresponds, in time, to the negative maximum 426 of the first time-derivative signal 420.

In summary, the zero crossing of the second time-derivative signal 440 occurs upon a (positive or negative) peak of the first time-derivative signal 420, see 428. In addition, it is recalled that the zero crossing detection signal 320, as output from the zero crossing detection unit 316 peaks for a predetermined short period in time to a "TRUE"-type value just after the course of the second time-derivative signal 314 has crossed the zero line. On this basis, the functioning of the multiplexer unit 310 can be explained as follows.

The so-called envelope signal 450 corresponds to the output of the controllable multiplexer unit 310, which receives as its input the first time-derivative signal 420, 304, and which receives as its control parameter the second time-derivative signal 440, 314. The multiplexer unit 310 transmits its input signal at that moment in time only during periods in time when the control parameter assumes the "TRUE" level, and holds the transmitted value until a next time, when the control parameter assumes the "TRUE" level, to then transmit its input signal at that moment in time.

In particular, the multiplexer unit 310 transmits the next envelope signal 430, 308 only during those time periods, in which the controlling zero crossing detection signal 320 assumes/peaks to the "TRUE"-type value. When the second time-derivative signal 440, 314 makes its first zero crossing (at 448), and the zero crossing detection signal 320 peaks to the "TRUE"-type value for the short period of time, then the multiplexer unit 310 transmits the value of the next envelope signal 430, 308 present during that short period of time, which is a positive value corresponding to the high level next envelope signal 446. Accordingly, the envelope signal 450 switches, from the low envelope level 452 and via the rising edge 454, to the high envelope level 456.

Then, when the second time-derivative signal 440, 314 makes its second zero crossing (at 448'), and the zero crossing detection signal 320 peaks again to the "TRUE"-type value for the short period of time, then the multiplexer unit 310 transmits the value of the next envelope signal 430, 308 present during that short period of time, which is a negative value corresponding to the low level next envelope signal 432. Accordingly, the envelope signal 450 switches, from the high envelope level 456 and via the falling edge 458, back to the low envelope level 452.

In summary, the envelope signal 450 toggles (as shown at 460, 460', 460'', 460$^{(3)}$) between the low envelope level 452 and the high envelope level 456 at each time when a zero crossing (as shown at 448, 448', 448'', 448$^{(3)}$) of the second time-derivative signal 440 occurs, as indicated by the dashed line at 460. These times, when the envelope signal 450 toggles, correspond to a rising edge 414 or a falling edge 418 of the signal 410 that is input to the signal processing block 300, which is the combined digital output signal 246, 346, S (as output from the channel combiner unit 244, 344 and reflecting the level of the outputs 230, 242 of the I-channel and the Q-channel analogue digital converters 228, 240).

Figure 5:
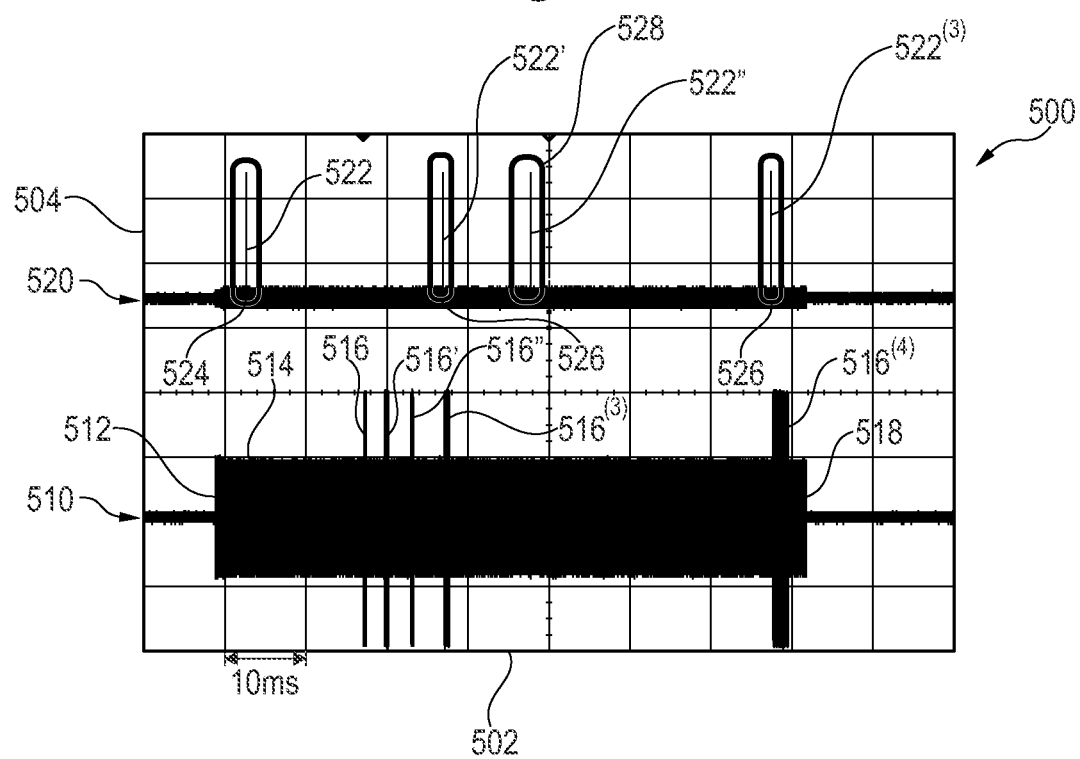
FIG. 5 is a diagram, which shows exemplary measured timing diagrams of signals present during operation of a receiver, namely a timing diagram of an RF field signal as detected during an NFC transaction (lower curve) and a timing diagram of an instrumentation signal of a general purpose IO interface of an NFC controller during the NCF transaction (upper curve).

FIG. 5 is a diagram 500, which shows exemplary measured timing diagrams of signals 510, 520 present during operation of an NFC receiver 102, 1122, 1162, namely a timing diagram of an RF field signal as detected 510 during an NFC transaction (lower curve) and a timing diagram of an instrumentation signal 520 of a general purpose IO interface of an NFC controller 1164 during the NCF transaction (upper curve). The diagram has a horizontal axis 502, which represents the course of time, wherein the time interval scale between two neighbouring marks is 10 ms; and a vertical axis 504, which represents a signal strength, in an arbitrary unit, which may be for example by a signal voltage.

The RF field signal as detected 510 during an NFC transaction is initially off and as such shows only some noise, then switches on (or starts) at 512, and assumes a polling value (at 514) that corresponds to an average field strength of a reader-generated field, i.e. an RF field strength generated by an NFC polling device 1110, such as a card reader, operating in the transmitting mode. A plurality of card transmission signals 516, 516', 516'', 516$^{(3)}$, 516$^{(4)}$, which are prompted in an NFC listening device 1160, such as a smart card or a smartphone having NFC functionality, in response to requests transmitted by the NFC polling device 1110, "peak out" from the average field strength of a reader-generated field 514 in the form of "spikes", before the polling RF field is switched off (or ends) at 518. The course of the RF field signal as detected 510 covers a complete NFC transaction, which comprises the switching on, at 512, of the RF field transmitted by the NFC polling device 1110, multiple response signals in the form of the card transmission signals 516, 516', 516'', 516$^{(3)}$, 516$^{(4)}$ that are generated by the NFC listening device 1160 during a temporary switching to the transmitting mode of operation, and finally the switching off, at 518, of the polling RF field.

The instrumentation signal 520 shown in FIG. 5 as the upper curve is a signal, which occurs in a general purpose IO interface of an NFC controller 1164, which is coupled to the receiver 1162, of the listening NFC device 1160, and which corresponds to the RF field signal as detected 510 during the NFC transaction as shown in FIG. 5 as the lower curve. In the listening NFC device 1160, the dynamic adjustment by the threshold calculation unit 362, including the calculation and the setting, of the threshold value 360 applied to the threshold comparison unit 306 according to the present invention, as explained with reference to FIGS. 2B and 3B, is implemented in the receiver 1162. Accordingly, the threshold value is dynamically switched in the receiver 1162, and each one of these switches causes an output value toggle, at 522, 522', 522", 522$^{(3)}$, which peaks out from the instrumentation signal 510 as a "spike".

In the course of the instrumentation signal 510, the first output value toggle 522 corresponds to a switching of the threshold performed in response to the detected change, at 512, of the RF field signal as detected 510. The second output value toggle 522' and the fourth output value toggle 522$^{(3)}$ correspond to respective dynamic adjustments or switchings, at 516" and at 516$^{(4)}$, of the threshold value performed immediately prior to a switching of the mode of operation of the NFC device 1160 from the receiving mode to the transmitting mode. The third output value toggle 522" corresponds to a switching of the threshold performed according to a configurable timer or periodic timing, which has a configurable period during a reception wait time.

FIG. 6A shows an exemplary measured timing diagram 610 of a signal present in a signal processing block 148, 248, 300 during operation of a receiver 102, 1122, 1162, namely a timing diagram 610 of a combined digital output signal 614, or 146, 246, 346, as output from the I&Q channel combiner unit 144, 244, 344 and as input to the first differential filter 302.

The diagram 610 has a horizontal axis 612, which represents the course of time, wherein the time scale is in μs and the time interval between two neighbouring marks is 50 μs; and a vertical axis 614, which represents a signal strength, in units of multiples of the least significant bit (LSB) as output from the analog-digital-converters 228, 240.

One can see in FIG. 6A that the combined digital output signal 614 has plural, in particular seven, signal events, in the time interval from approximately 185 μs to approximately 265 μs, which peak out of the noise floor, downwardly as shown in FIG. 6A.

FIG. 6B shows an exemplary measured timing diagram 620 of two signals present in the signal processing block 148, 248, 300 during operation of a receiver 102, 1122, 1162, namely a timing diagram 620 of the absolute value of a first time-derivative signal 626, 304 as output from the first differential filter 302, and a timing diagram of a conventional threshold value signal 628, 260, 360, as applied by a conventional static threshold value setting unit 258, 358, to a threshold parameter input of the threshold comparison unit 306 in FIG. 3A.

The diagram 620 has a horizontal axis 622, which represents the course of time, wherein the time scale is in μs and the time interval between two neighbouring marks is 50 μs; and a vertical axis 624, which represents a signal strength, in units of multiples of the least significant bit (LSB) as output from the analogue digital converters 228, 240.

One can see in FIG. 6B that the absolute value of the first time-derivative signal 626 shows plural, in particular seven, signal structures, each of which comprises a positive maximum and a negative maximum as shown schematically at 424 and 426 in FIG. 4. These (in FIG. 6B seven) signal structures in FIG. 6B correspond, in the course of time, to the (in FIG. 6A seven) signal events in FIG. 6A.

One can further see in FIG. 6B that the conventional threshold value signal 628 has, in the time periods before and after the (in FIG. 6B seven) signal structures of the absolute value of the first time-derivative signal 626, a level that is within the noise floor 629. Such a level is not suitable to discriminate the noise 629 from real nominal signal structures 626.

FIG. 6C shows an exemplary measured timing diagram 630 of a signal present in the signal processing block 148, 248, 300 during operation of a receiver 102, 1122, 1162, namely a timing diagram 630 of the output signal 636 (at 322 in FIG. 3A) of a conventional edge detection filter (comprising the elements 302, 306, 310, 312, and 316 in FIG. 3A), using the conventional threshold value signal 628 shown in FIG. 6B as the threshold parameter input of the threshold comparison unit 306 in FIG. 3A.

The diagram 630 has a horizontal axis 632, which represents the course of time, wherein the time scale is in μs and the time interval between two neighbouring marks is 50 μs; and a vertical axis 634, which represents a binary output, in units of [0, 1] (normalized amplitude).

One can see in FIG. 6C that the output signal 636 of the edge detection filter in FIG. 3A shows edge detection events at each occurrence of a signal peak, be it a signal peak on the noise floor 629 or a signal peak of a real signal 626 in FIG. 6B. One can see that the conventional edge detection filter does not discriminate the noise signals 629 from real nominal signal structures 626 in FIG. 6B.

FIG. 6D shows an exemplary measured timing diagram 640 of two signals present in the signal processing block 248, 300 during operation of a receiver 102, 1122, 1162, namely a timing diagram 640 of the absolute value of a first time-derivative signal 646, 304 as output from the first differential filter 302, and a timing diagram of a dynamically calculated threshold value signal 648, 260, 360, as applied by a threshold calculation unit 262, 362 according to the invention, to a threshold parameter input of a threshold comparison unit 306 in FIG. 3B, according to an exemplifying embodiment of the present invention.

The diagram 640 has a horizontal axis 642, which represents the course of time, wherein the time scale is in μs and the time interval between two neighbouring marks is 50 μs; and a vertical axis 644, which represents a signal strength, in units of multiples of the least significant bit (LSB) as output from the analogue digital converters 228, 240.

One can see in FIG. 6D that the absolute value of the first time-derivative signal 646 shows plural, in particular seven, signal structures, each of which comprises a positive maximum and a negative maximum as shown schematically at 424 and 426 in FIG. 4. These (in FIG. 6D) seven signal structures in FIG. 6D correspond, in the course of time, to the (in FIG. 6A) seven signal events in FIG. 6A.

One can further see in FIG. 6D that the dynamically calculated threshold value signal 648 has, in the time periods before and after the (in FIG. 6D) seven signal structures of the absolute value of the first time-derivative signal 646, a level that is well above the noise floor 629. This level is well suitable to discriminate the noise 629 from real nominal signal structures 626.

FIG. 6E shows an exemplary measured timing diagram 650 of a signal present in the signal processing block 248, 300 during operation of a receiver 1122, 1162, namely a timing diagram 650 of the output of an edge detection filter (comprising the elements 302, 306, 310, 312, and 316 in FIG. 3B) using the dynamically calculated threshold value signal 260, 360 according to the invention and shown in FIG. 6D as the threshold parameter input of the threshold comparison unit 306 in FIG. 3B, according to an exemplifying embodiment of the present invention.

The diagram 650 has a horizontal axis 652, which represents the course of time, wherein the time scale is in μs and the time interval between two neighbouring marks is 50 μs; and a vertical axis 654, which represents a binary signal, in units of [0, 1] (normalized amplitude).

One can see in FIG. 6E that the output signal 656 of the edge detection filter in FIG. 3B shows edge detection events only for signal peaks of real signal structures 646 in FIG. 6D. One can see that the edge detection filter in FIG. 3B, which uses the dynamically calculated threshold value signal 260, 360 according to the invention, discriminates the noise signals 629 from the real nominal signal structures 646 in FIG. 6D.

FIG. 6F shows an exemplary measured timing diagram 660 of two signals 667 and 669 present in the signal processing block 248, 300 of FIGS. 2B and 3B during operation of a receiver 1122, 1162, namely a timing diagram 660 of a combined digital output signal 667, or 146, 246, 346, S, as output from the channel combiner unit 244, 344 in FIGS. 2B and 3B and as input to the first differential filter 302 in FIG. 3B (lower curve), and a timing diagram of the associated absolute value of the first time-derivative signal 669, 304 as output from the first differential filter 302 in FIG. 3B (upper curve), and illustrating a dynamically calculated threshold value 670, according to an exemplifying embodiment of the present invention.

The diagram 660 has a horizontal axis 662, which represents the course of time, wherein the time scale is in μs and the time interval between two neighbouring marks is 50 μs; and a vertical axis 664, which represents a signal strength, in units of multiples of the least significant bit (LSB) as output from the analogue digital converters 228, 240.

One can see in FIG. 6F that the combined digital output signal 614 has plural, in particular, seven signal events, in the time interval from approximately 185 μs to approximately 265 μs, which peak out of the noise floor, downwardly as shown in FIG. 6F. The plural (in FIG. 6F seven) signal events 667 in FIG. 6F correspond to the plural (in FIG. 6A seven) signal events 616 in FIG. 6A.

One can further see in FIG. 6F that the absolute value of the first time-derivative signal 669 shows plural, in particular, seven signal structures, each of which comprises a positive maximum and a negative maximum as shown schematically at 424 and 426 in FIG. 4. These (in FIG. 6F seven) signal structures 669 correspond, in the course of time, to the (in FIG. 6F seven) signal events 667 of combined digital output signal.

One can further see in FIG. 6F that each maximum of the absolute value of the first time-derivative signal 669 has in fact a maximum peak and a minimum peak. A line 666 is shown, which indicates the level of the minimum peaks, and which indicates a reference level that is used in the definition of the gain 665 of the first differential filter 302.

The first differential filter gain 665 is defined as the gain from (or ratio between) the minimum peak level 666 of maxima of the absolute value of the first time-derivative signal 669 to the level of the input signal for the first differential filter 302 without modulation, viz. the level of the combined digital output signal 667 without modulation, i.e. without the plural (in FIG. 6F seven) signal events. In other words, the first differential filter gain 665 is defined as the ratio between the minimum peak level 666 of maxima of the absolute value of the first time-derivative signal 669 and the level of the input signal for the first differential filter 302.

In other contexts, namely in respect of what is illustrated in the FIGS. 8A to 8J, the first differential filter gain 665 is also referred to as the "filter gain". The first differential filter gain is illustrated in FIG. 6F by the upwardly pointing arrow at 665.

The value of the threshold 670 indicated in FIG. 6F is determined according to the following equation:

$$THLD = FDFG * \delta, \quad (6)$$

wherein THLD is the threshold value (at 670 in FIG. 6F), FDFG is the first differential filter gain (illustrated at 665 in FIG. 6F), and δ is the confidence level. The confidence level δ appears also in the equation (2) provided above.

The confidence level δ, as used according to the present invention, is a product-specific parameter. The confidence level δ is not related to a standard. Rather, the confidence level δ is a scaling factor that is applied on the minimum peak level, at 666 in FIG. 6F, of the first differential signal 669, 304, to yield the threshold value, at 670 in FIG. 6F. The confidence level δ allows to set the threshold value 670 to a well-suited position in consideration of the variations, distortion, noise, etc., imposed on data received by the reader 1122, 1162. In order not to miss any edge of a real signal, as well as not to be falsely triggered by noise signals, the confidence level δ is by definition restricted to the interval between 0 (zero, 0%) and 1 (one, 100%), and may be chosen, in embodiments of the present invention, to be between 20% and 90%, advantageously between 30% and 80%, more advantageously between 40% and 70%, and still more advantageously to be 60%.

The latter value, viz. a confidence level of δ=60%, has turned out to provide a reliable discrimination of real signals against the noise floor, and thus is applied in FIG. 6F and also in other embodiments of the present invention, including notably the embodiments discussed further below with reference to the FIGS. 8A to 8J.

Figure 7:
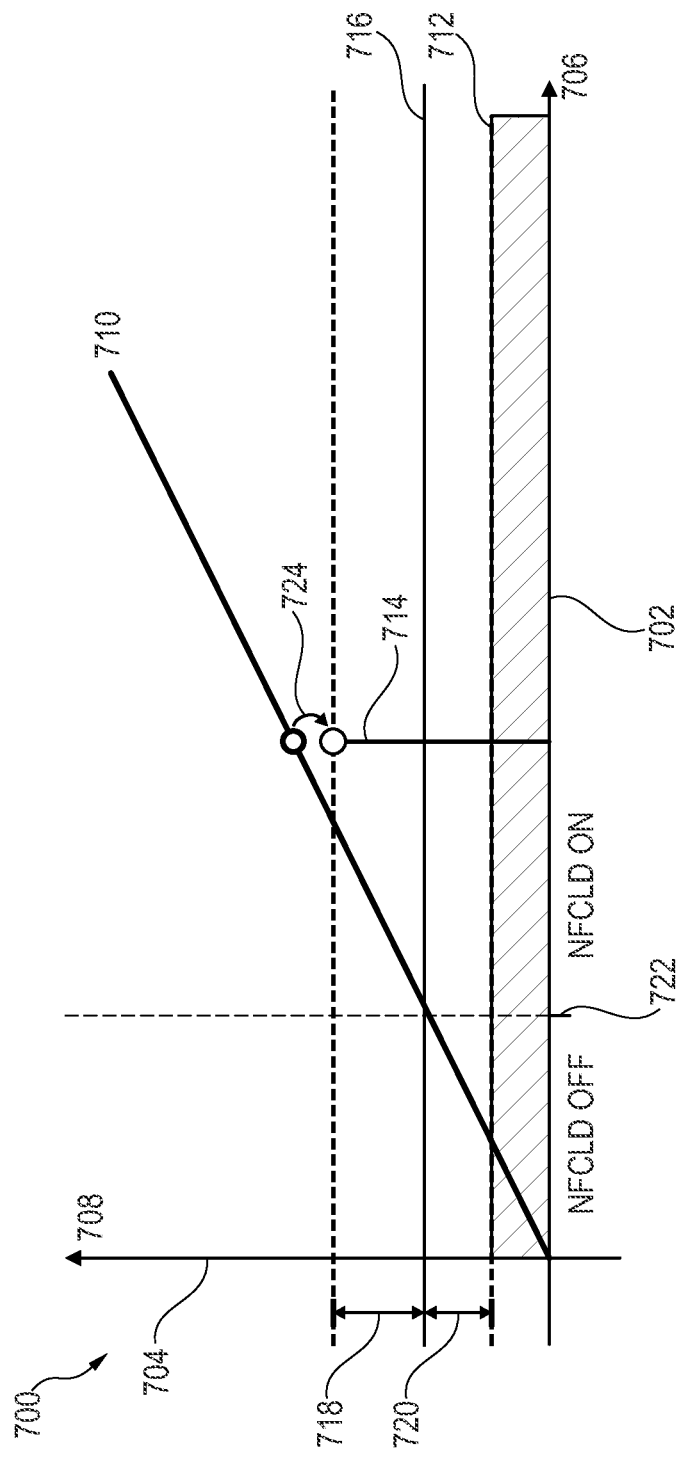
FIG. 7 is a diagram, which illustrates a basic principle of dynamically calculating a threshold value as a function of an RSSI value, with a confidence level and a margin associated to RSSI and for discriminating against noise, according to an exemplifying embodiment of the present invention.

FIG. 7 is a diagram 700, which illustrates a basic principle of dynamically calculating a threshold value (260 in FIG. 2B, 360 in FIG. 3B, 670 in FIG. 6F) as a function 710 of an RSSI value (264 in FIG. 2B), with a confidence level 718, δ, and a margin 720, M, associated to RSSI, and for discriminating against noise, according to an exemplifying embodiment of the present invention.

The diagram 700 has a horizontal axis 702, which represents the field strength 706 as detected (in arbitrary units), and a vertical axis 704, which represents a signal strength, namely the first time-derivative signal (see 304 in FIG. 3B).

It can be seen in FIG. 7 that the RSSI value is a linear function 710 of the field strength 706, and/or of the first time-derivative signal 708. A margin 720, M, and confidence value 718, δ, have been initially determined as product-specific parameters in a calibration procedure that has been performed after the manufacture of an NFC device 1120, 1160 and before delivery of the NFC device 1120, 1160 and/or the building-in of the NFC device 1160 in a communication device, such as a smart phone, a tablet, or a smart card. An initial threshold value, at 760, has been determined from an initially determined first differential signal 714 by applying (multiplying therewith) the confidence value 718, δ.

When the signal strength represented by the first time-derivative signal 708 raises out of a noise level 712 and, at 724 in FIG. 7, above a value that corresponds to an initially determined confidence value 718, the dynamical determination of the threshold begins and a threshold value is calculated as a function of the RSSI value (264 in FIG. 2B) and compensated by the GC value (266 in FIG. 2B) according to equation (3), as indicated by the bent arrow 724 in FIG. 7.

In respect of the detected RF field strength 706, there is a lower limit for the application of the invention in general and for the, in particular, dynamic determination of the threshold value as a function of the RSSI value. Namely, if an RF field external to the NFC device 1120, 1160 has a detected field strength 706 that is below a pre-determined minimum threshold field strength (herein also referred to as NFCLD ON threshold), which is indicated at 722 in FIG. 7, the NFC signal level detection (NFCLD) and the signal edge detection filtering functionality are switched off (NFCLD OFF in FIG. 7). Alternatively, or in addition, the threshold value (360 in FIG. 3B) that is applied to the threshold comparison unit (306 in FIG. 3B) may be set to a maximum value so that the detection of real signals is in fact disabled, and/or a decoder 324 that is connected, in a signal processing path, downstream of the threshold comparison unit 306, may be disabled.

The dynamic determination of the threshold value according to the present invention is used, and the signal edge detection filtering functionality is switched on (NFCLD ON in FIG. 7), only when the detected RF field strength 706 is above the pre-determined minimum threshold field strength (i.e. the NFCLD ON threshold) 722.

Figure 11:
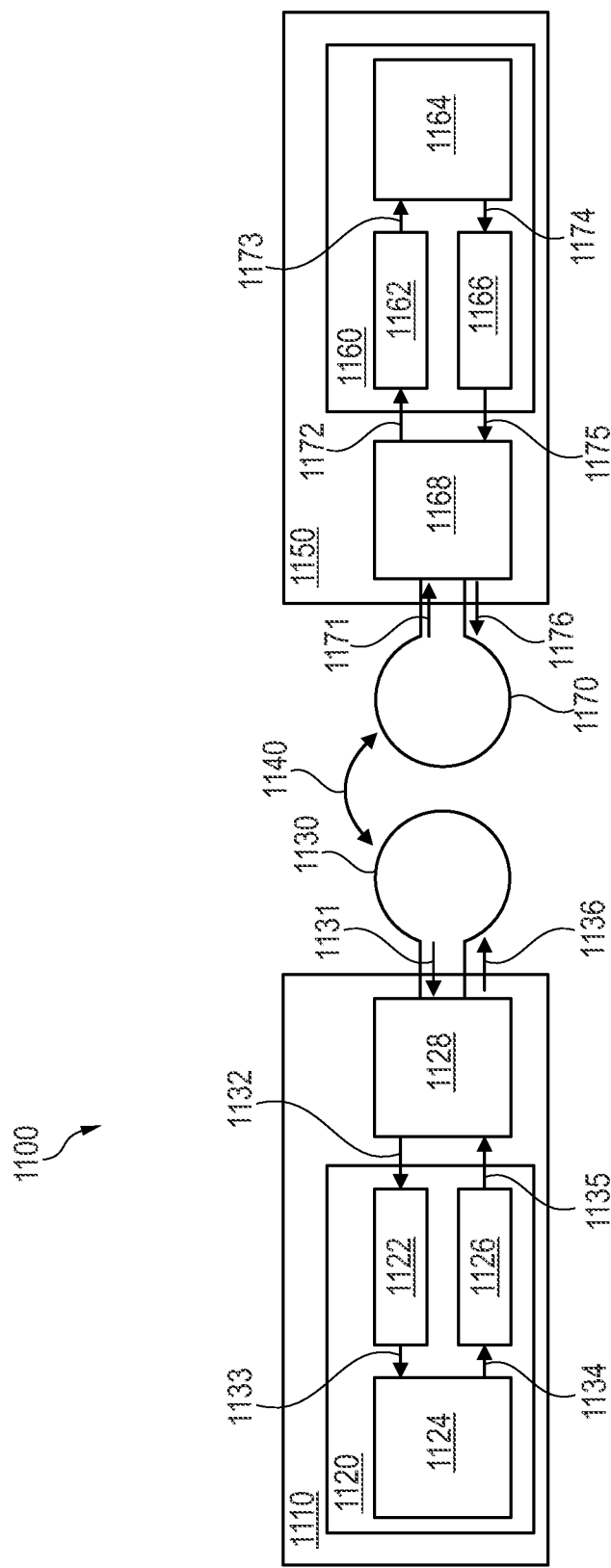
FIG. 11 shows a conventional near-field communication, NFC, arrangement comprising a polling NFC device and a listening NFC device.

Turning now to FIGS. 8A to 8J and FIG. 8, the calibration procedure for determining the margin value M and/or the confidence level δ will be explained. As has been stated above, the margin 720, M, and the confidence value 718, δ, are determined initially as product-specific parameters in a calibration procedure, which is performed after the manufacture of an NFC device 1120, 1160 and before the delivery of the NFC device 1120, 1160. The calibration procedure takes into account that a receiver 1122, 1162 of an NFC device 1120, 1160 (see FIG. 11) and a communication signal interface between the receiver 1122, 1162 and the processing unit 1124, 1164 of an NFC device 1120, 1160 may be programmed before delivery and/or further incorporation into hosting systems of the NFC device 1120, 1160 according to different specific technologies of data handling and processing, which are used in different applications of the NFC devices 1120, 1160 or by different purchasers of the NFC devices 1120, 1160. Herein, the expression "technology" is meant in particular to refer to different types of signal modulation, modulation index, bit representation, and coding of the signal that is output from a receiver 1122, 1162, in particular for example from the decoder 324, of the NFC device 1120, 1160.

In the framework of the present invention, the following different specific conventional technologies are taken into account:
  i) type A, as specified in ISO 14443-2-A/NFCForum specifications,
  ii) type B, as specified in ISO 14443-2-B/NFCForum specifications, and
  iii) type C, as specified in FeliCa protocol/NFCForum Analogue specifications.

In different implementations of NFC devices, these technologies may be implemented conventionally with different bit rates, in particular bit rates of 106 kBit/s, 212 kBit/s, 424 kBit/s, and 848 kBit/s, as summarized in the following table 1.

TABLE 1 combined communication signal interface and bit rates

|  |  | Bit rate in kBit/s | | | |
| --- | --- | --- | --- | --- | --- |
| Technology | | 106 | 212 | 424 | 848 |
| Communication | Type A | A106 | A212 | A424 | A848 |
| signal | Type B | B106 | B212 | B424 | B848 |
| interface | Type F |  | F212 | F424 |  |

According the present invention and as summarized in table 1, the following particular technologies are taken into account for determining the margin value and/or the confidence level in the calibration procedure:
 A106, A212, A424, A848, B106, B212, B424, B848, F212, and F424.

It is conventional and known that these different technologies have different parameters in respect of signal handling and processing, the output of a receiver 1122, 1162 and/or in the communication signal interface between the receiver 1122, 1162 and the processing unit 1124, 1164 of an NFC device 1120, 1160. Those different parameters include for example signal modulation, modulation index, bit representation, and the time course of a rising edge, a falling edge, and a signal overshoot. The diversity of these parameters is standardized according to ISO14443-2 for type A and type B technology and according to FeliCa for type F technology in so-called signal patterns.

These signal patterns each comprise a plurality of standardized signal patterns, which may also be referred to as wave shapes, and which are identified according to the standard by pattern condition numbers. A signal pattern further produces a gain maximum of the first filter stage in the signal processing block 148, 248, 300 (see FIGS. 1, 2A, 2B, 3A, and 3B), to which filter the combined signal S that is output from the channel combiner unit 144, 244, 344 is input. In the language of the standardized signal patterns, this first filter stage is referred to as "the matched filter" (MF). In the context of the present application, this first filter stage is the first differential filter 302 of the signal processing block 300.

The signal patterns according to ISO14443-2 (type A and type B) and according to FeliCa (type F), i.e. for each one of the accounted-for technologies A106, A212, A424, A848, B106, B212, B424, B848, F212, and F424, are illustrated in the FIGS. 8A to 8J, respectively.

It can be seen from the FIGS. 8A to 8J that in each signal pattern, there is one pattern condition, as identified by the respective pattern condition number, for which the associated matched filter gain (herein: the gain of the first differential filter 302, herein called first differential filter gain (FDFG)) is a minimum for the respective ISO pattern.

In embodiments of the present invention, that matched filter gain (herein: gain of the first differential filter 302), which is the minimum for the respective pattern, is used as a first basis for determining the margin value in the calibration procedure. The so-defined filter gain (herein: first differential filter gain) shall herein be also referred to as the "worst case pattern number".

A second basis for determining the margin value in the calibration procedure is the selection of the value for the confidence level to be δ=60%. This has been discussed above with reference to the illustration in FIG. 6F.

For each accounted-for technology, an initial threshold value THLD0 is determined as has been described above with reference to FIG. 6F and according to equation (6) as:

$$THLD0 = FDFG * \delta, \qquad (6')$$

having the confidence level selected to be δ=60% and taking the first differential filter gain FDFG (or "filter gain"), which is the minimum (or "worst case") for the respective signal pattern.

FIG. 8A shows, for a combination of a communication signal interface of A-type and a bitrate of 106 kbps ("A106"), a diagram 800 of the associated ISO 14443-2 signal pattern 801, which specifies, for each one of a predetermined plurality of pattern conditions 802, the associated "matched filter gain" (first differential filter gain) 803.

The diagram 800 has a horizontal axis 802, which indicates the pattern condition number, and a vertical axis 803, which indicates the "matched filter gain" (first differential filter gain).

In the signal pattern 801 for A-106, as shown in FIG. 8A, the following pattern-specific quantities are indicated:
i) that pattern number 804, to which the lowest first differential filter gain 805 is associated ("worst case pattern number"),
ii) the associated lowest first differential filter gain 805,
iii) a threshold value 807 determined in the calibration procedure as a function of the associated lowest first differential filter gain 805 by applying the confidence level of 60% (according to equation (6'),
iv) a corresponding, in particular lower, threshold value 808 determined during the calibration and configured advantageously for implementation, and
v) a noise floor 809.

It is to be explained that the threshold value 808 (THLD) configured advantageously for implementation is obtained on the basis of the threshold value 807 determined in the calibration procedure to be the next lower integer that can be expressed as a power of two. Using in implementations of the present invention a threshold value that can be expressed as a power of two has the advantage that a multiplication of a signal value by the threshold value THLD, which may be expensive in implementations in terms of circuitry of software instructions, can simply be implemented as a left-shift or a right-shift of the signal value. The thus obtained integer that is the next lower to the determined threshold value (THLD) that can be expressed as a power of two, is referred to herein as the fixed point threshold value (THLD_fp).

It can be read from FIG. 8A, that for the signal pattern associated to the technology A106,
the pattern number 804, to which the lowest first differential filter gain 805 is associated, viz. the worst case pattern number, is pattern number 4;
the associated lowest matched filter gain (first differential filter gain) 805 is 24.9;
the initial threshold THLD0 807 obtained by applying the confidence level of 60% to the determined lowest matched filter gain is 14.9;
the fixed point threshold value 808 THLD_fp advantageous for implementation is 8.

These values are summarized in the Table shown in FIG. 8K in the column associated to A106.

FIG. 8B is a diagram 810 similar to that of FIG. 8A, which indicates the same types of pattern-specific quantities, though for an ISO 14443-2 signal pattern 801 that is associated with a combination of a communication signal interface of A-type and a bitrate of 212 kbps ("A212").

It can be read from FIG. 8B, that for the signal pattern associated to the technology A212,
the pattern number 804, to which the lowest first differential filter gain 805 is associated, viz. the worst case pattern number, is pattern number 20;
the associated lowest matched filter gain (first differential filter gain) 805 is 5.0;
the initial threshold THLD0 807 obtained by applying the confidence level of 60% to the determined lowest matched filter gain is 3.0;
the fixed point threshold value 808 THLD_fp advantageous for implementation is 2.

These values are summarized in the Table shown in FIG. 8K in the column associated to A212.

Figure 8D:
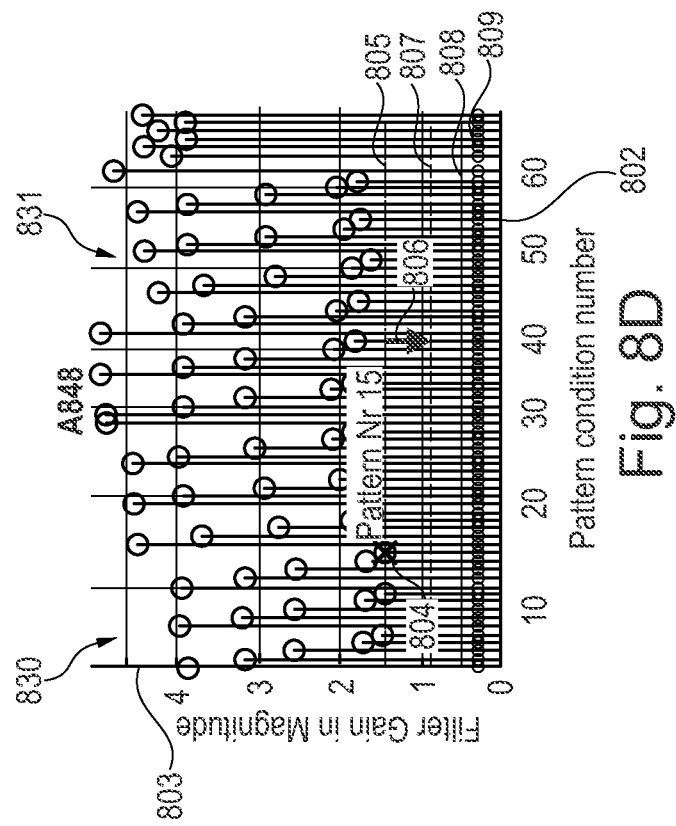
FIG. 8D is a diagram similar to that of FIG. 8A, which indicates the same types of pattern-specific quantities, though for an ISO 14443-2 signal pattern that is associated with a combination of a communication signal interface of A-type and a bitrate of 848 kbps.
Figure 8C:
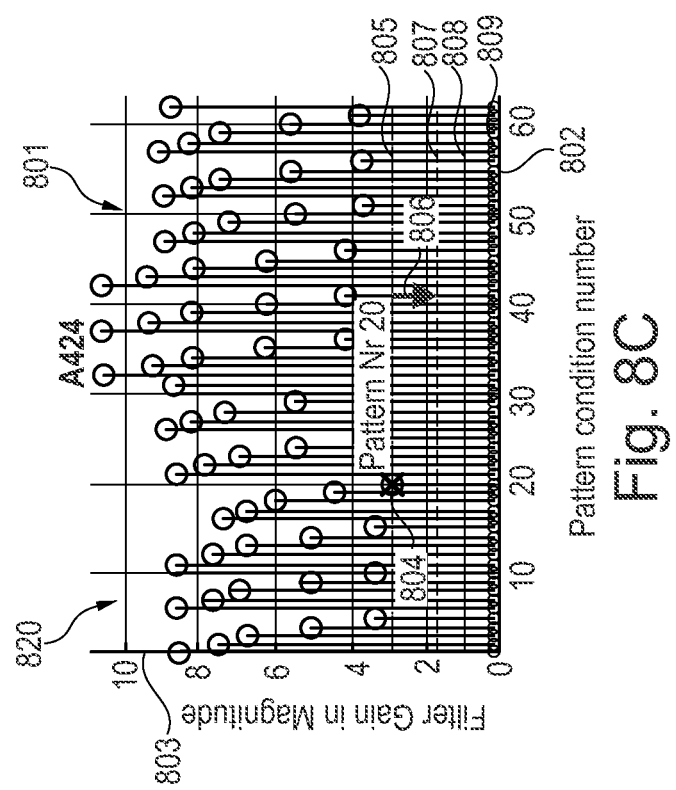
FIG. 8C is a diagram similar to that of FIG. 8A, which indicates the same types of pattern-specific quantities, though for an ISO 14443-2 signal pattern that is associated with a combination of a communication signal interface of A-type and a bitrate of 424 kbps.

FIG. 8C is a diagram 820 similar to that of FIG. 8A, which indicates the same types of pattern-specific quantities, though for an ISO 14443-2 signal pattern 801 that is associated with a combination of a communication signal interface of A-type and a bitrate of 424 kbps ("A424").

It can be read from FIG. 8C, that for the signal pattern associated to the technology A424,
the pattern number 804, to which the lowest first differential filter gain 805 is associated, viz. the worst case pattern number, is pattern number 20;
the associated lowest matched filter gain (first differential filter gain) 805 is 2.9;
the initial threshold THLD0 807 obtained by applying the confidence level of 60% to the determined lowest matched filter gain is 1.7;
the fixed point threshold value 808 THLD_fp advantageous for implementation is 1.

These values are summarized in the Table shown in FIG. 8K in the column associated to A424.

FIG. 8D is a diagram 830 similar to that of FIG. 8A, which indicates the same types of pattern-specific quantities, though for an ISO 14443-2 signal pattern 801 that is associated with a combination of a communication signal interface of A-type and a bitrate of 848 kbps ("A848").

It can be read from FIG. 8D, that for the signal pattern associated to the technology A848,
the pattern number 804, to which the lowest first differential filter gain 805 is associated, viz. the worst case pattern number, is pattern number 15;
the associated lowest matched filter gain (first differential filter gain) 805 is 1.4;
the initial threshold THLD0 807 obtained by applying the confidence level of 60% to the determined lowest matched filter gain is 0.8;
the fixed point threshold value 808 THLD_fp advantageous for implementation is 0.5.

These values are summarized in the Table shown in FIG. 8K in the column associated to A848.

FIG. 8E is a diagram 840 similar to that of FIG. 8A, which indicates the same types of pattern-specific quantities, though for an ISO 14443-2 signal pattern 801 that is associated with a combination of a communication signal interface of B-type and a bitrate of 106 kbps ("B106").

It can be read from FIG. 8E, that for the signal pattern associated to the technology B106,
the pattern number 804, to which the lowest first differential filter gain 805 is associated, viz. the worst case pattern number, is pattern number 8;
the associated lowest matched filter gain (first differential filter gain) 805 is 2.6;
the initial threshold THLD0 807 obtained by applying the confidence level of 60% to the determined lowest matched filter gain is 1.5;
the fixed point threshold value 808 THLD_fp advantageous for implementation is 1.

These values are summarized in the Table shown in FIG. 8K in the column associated to B106.

FIG. 8F is a diagram 850 similar to that of FIG. 8A, which indicates the same types of pattern-specific quantities, though for an ISO 14443-2 signal pattern 801 that is associated with a combination of a communication signal interface of B-type and a bitrate of 212 kbps ("B212").

It can be read from FIG. 8F, that for the signal pattern associated to the technology B212,
the pattern number 804, to which the lowest first differential filter gain 805 is associated, viz. the worst case pattern number, is pattern number 4;

the associated lowest matched filter gain (first differential filter gain) 805 is 2.6;

the initial threshold THLD0 807 obtained by applying the confidence level of 60% to the determined lowest matched filter gain is 1.5;

the fixed point threshold value 808 THLD_fp advantageous for implementation is 1.

These values are summarized in the Table shown in FIG. 8K in the column associated to B212.

Figures 8G, 8H:
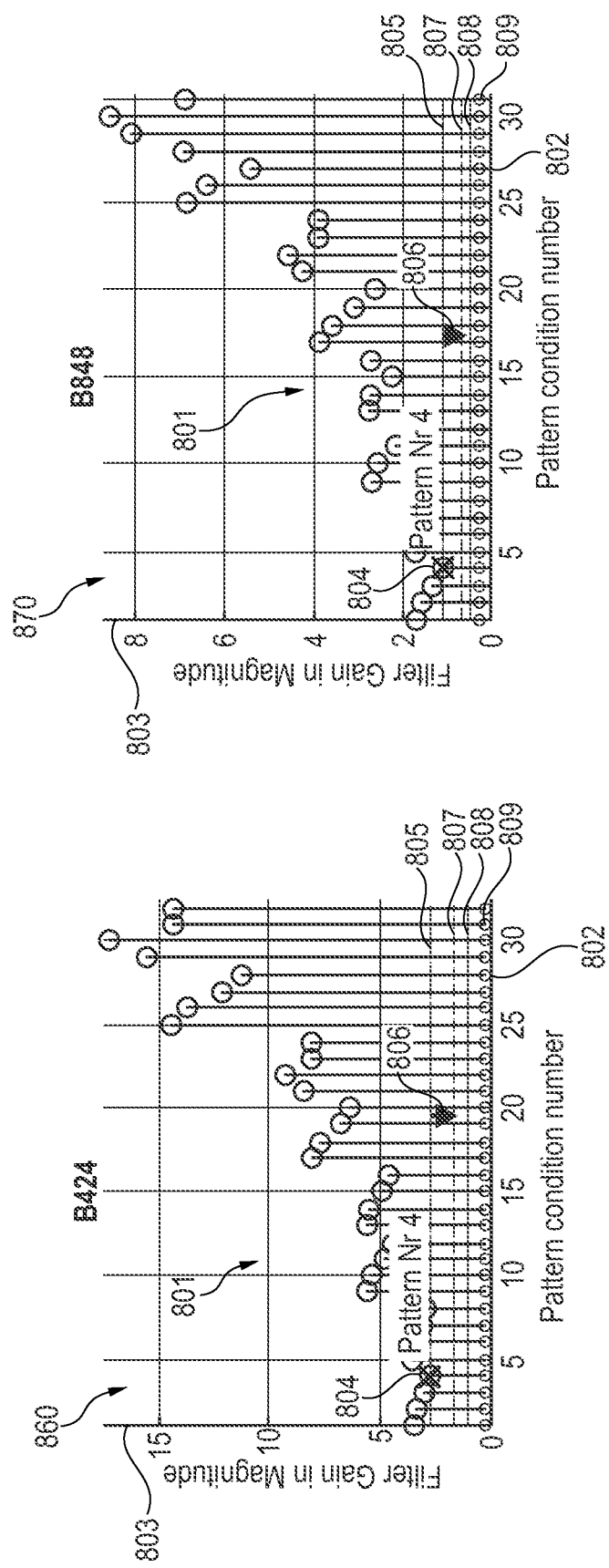
FIG. 8G is a diagram similar to that of FIG. 8A, which indicates the same types of pattern-specific quantities, though for an ISO 14443-2 signal pattern that is associated with a combination of a communication signal interface of B-type and a bitrate of 424 kbps.
FIG. 8H is a diagram similar to that of FIG. 8A, which indicates the same types of pattern-specific quantities, though for an ISO 14443-2 signal pattern that is associated with a combination of a communication signal interface of B-type and a bitrate of 848 kbps.

FIG. 8G is a diagram 860 similar to that of FIG. 8A, which indicates the same types of pattern-specific quantities, though for an ISO 14443-2 signal pattern 801 that is associated with a combination of a communication signal interface of B-type and a bitrate of 424 kbps ("B424").

It can be read from FIG. 8G, that for the signal pattern associated to the technology B424, the pattern number 804, to which the lowest first differential filter gain 805 is associated, viz. the worst case pattern number, is pattern number 4;

the associated lowest matched filter gain (first differential filter gain) 805 is 2.7;

the initial threshold THLD0 807 obtained by applying the confidence level of 60% to the determined lowest matched filter gain is 1.6;

the fixed point threshold value 808 THLD_fp advantageous for implementation is 1.

These values are summarized in the Table shown in FIG. 8K in the column associated to B424.

FIG. 8H is a diagram 870 similar to that of FIG. 8A, which indicates the same types of pattern-specific quantities, though for an ISO 14443-2 signal pattern 801 that is associated with a combination of a communication signal interface of B-type and a bitrate of 848 kbps ("B848").

It can be read from FIG. 8H, that for the signal pattern associated to the technology B848, the pattern number 804, to which the lowest first differential filter gain 805 is associated, viz. the worst case pattern number, is pattern number 4;

the associated lowest matched filter gain (first differential filter gain) 805 is 1.1;

the initial threshold THLD0 807 obtained by applying the confidence level of 60% to the determined lowest matched filter gain is 0.6;

the fixed point threshold value 808 THLD_fp advantageous for implementation is 0.5.

These values are summarized in the Table shown in FIG. 8K in the column associated to B848.

FIG. 8I is a diagram 880 similar to that of FIG. 8A, which indicates the same types of pattern-specific quantities, though for a FeliCa signal pattern 801 that is associated with a combination of a communication signal interface of F-type and a bitrate of 212 kbps ("F212").

It can be read from FIG. 8I, that for the signal pattern associated to the technology F212, the pattern number 804, to which the lowest first differential filter gain 805 is associated, viz. the worst case pattern number, is pattern number 4;

the associated lowest matched filter gain (first differential filter gain) 805 is 2.6;

the initial threshold THLD0 807 obtained by applying the confidence level of 60% to the determined lowest matched filter gain is 1.6;

the fixed point threshold value 808 THLD_fp advantageous for implementation is 1.

These values are summarized in the Table shown in FIG. 8K in the column associated to F212.

FIG. 8J is a diagram similar 890 to that of FIG. 8A, which indicates the same types of pattern-specific quantities, though for a FeliCa signal pattern 801 that is associated with a combination of a communication signal interface of F-type and a bitrate of 424 kbps ("F424").

It can be read from FIG. 8J, that for the signal pattern associated to the technology F424, the pattern number 804, to which the lowest first differential filter gain 805 is associated, viz. the worst case pattern number, is pattern number 4;

the associated lowest matched filter gain (first differential filter gain) 805 is 2.2;

the initial threshold THLD0 807 obtained by applying the confidence level of 60% to the determined lowest matched filter gain is 1.3;

the fixed point threshold value 808 THLD_fp advantageous for implementation is 1.

These values are summarized in the Table shown in FIG. 8K in the column associated to F424.

FIG. 8K shows a table, in which the pattern-specific quantities that can be read and are indicated in FIGS. 8A to 8J for the different technologies of communication signal interfaces are summarized.

The so-obtained pattern-specific quantities may be stored in a non-volatile storage of the NFC device 1120, 1160 as product-specific parameters, and can, in operation of the NFC device 1120, 1160, be used as initial values in the dynamic calculation of the threshold value according to the present invention.

Figure 9:
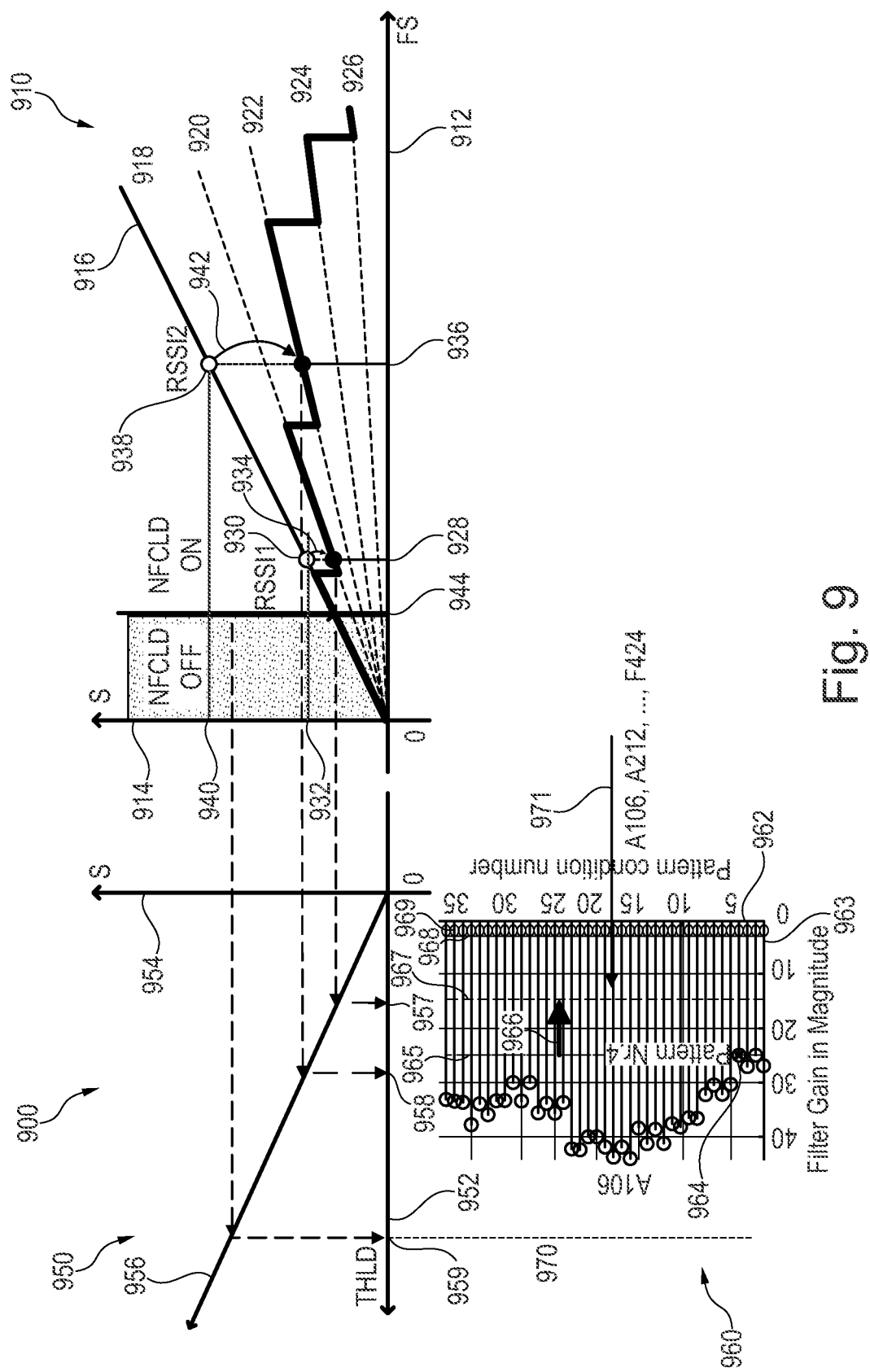
FIG. 9 shows, as a summary of exemplifying embodiment of the present invention, a combination of three diagrams, wherein the first diagram in the upper right is a plot of a combined digital output signal, S, indicated as ordinate, versus a field strength, indicated as abscissa, for a plurality of different GC values (Gain 0, . . . , Gain 4), thereby illustrating the calculation of the threshold as a function of the RSSI value compensated with the GC value (viz. THL-D∝RSSI/GC); the second diagram in the upper left is a plot of a combined digital output signal, S, indicated as ordinate, versus a matched filter gain (first differential filter gain), indicated as abscissa, which are substantially linearly related with the margin, M, as a proportionality factor; and the third diagram in the lower left is a plot of a calculated threshold value, indicated as a first ordinate, or of a re-scaled (by the confidence level δ=60%) second ordinate, which represents a first differential filter gain (matched filter gain), versus the signal pattern condition number, indicated as abscissa, of one of the communication signal interface combinations, namely A-106, which is illustrated only by way of example for the plurality (or diversity) of applicable communication signal interface technologies shown in the FIGS. 8A to 8J

FIG. 9 shows, as a summary of exemplifying embodiment of the present invention, a combination of three diagrams 910, 950, and 960.

The first diagram 910 is a plot of a combined digital output signal, S, indicated as x1-axis 912, versus a field strength, indicated as y1-axis 914, for a plurality of different GC values (Gain 4 (at 918), . . . , Gain 0 (at 926)), thereby illustrating the calculation of the threshold as a function of the RSSI value 916 compensated with the applicable GC value 918, 920, 924, 926 (viz. THLD∝RSSI/GC).

The first diagram 910 is similar to the diagram 700 shown in FIG. 7. It is illustrated that when the detected field strength FS, 912, rises above the minimum threshold 944, and accordingly the measured RSSI value 916 rises proportionally, when a first field strength 928 and a first RSSI value 930 is reached, the measured first RSSI value 930 is compensated by (i.e. divided by) the applicable GC value 920, as indicated at 934—in the threshold value calculation unit (see 262 in FIG. 2B) using the applicable GC value 920. When the detected field strength FS, 912, rises further, the gain control value determination unit (see 254 in FIG. 2B) determines an adjusted (i.e. the next lower one of the applicable discrete) gain value 922. When the detected field strength FS, 912, rises still further, the measured first RSSI value is again compensated by (i.e. divided by) the then applicable GC value 922, as indicated at 942. When the detected field strength FS, 912, rises still further, the gain control value determination unit 254 (see FIG. 2B) determines another adjusted (i.e. the next lower one of the applicable discrete) gain value 924.

On the other hand, when the detected RF field strength 912 is below the pre-determined minimum threshold field strength, indicated at 944, the NFC signal level detection (NFCLD) and the signal edge detection filtering functionality are switched off (NFCLD OFF in FIG. 7). Alternatively, or in addition, the threshold value (360 in FIG. 3B) that is applied to the threshold comparison unit (306 in FIG. 3B) may be set to a maximum value (indicated at 959 in the diagram 950) so that the detection of real signals is in fact disabled, and/or a decoder (324 in FIG. 3B) that is connected, in a signal processing path, downstream of the threshold comparison unit (306 in FIG. 3B), may be disabled.

The second diagram 950 is a plot of a combined digital output signal, S, indicated as y2-axis 954, versus a calculated threshold value 952, indicated as x2-axis 952. It has been explained above that these two quantities, viz. the combined digital output signal (without modulation, at 672 in FIG. 6F) and the calculated threshold value (at 670 in FIG. 6F) are substantially linearly related with the margin value 673, M, being a proportionality factor.

The third diagram 960 is a plot of a calculated threshold value 952, indicated as a first y3-axis 952, or of a re-scaled (by the confidence level δ=60%) second y3-axis 963, which represents a first differential filter gain (filter gain), versus the pattern condition number, indicated as x3-axis 962, of one of the communication signal interface combinations, namely A-106. The latter is illustrated only by way of example for the plurality (or diversity) of applicable communication signal interface technologies shown in the FIGS. 8A to 8J.

Figure 10:
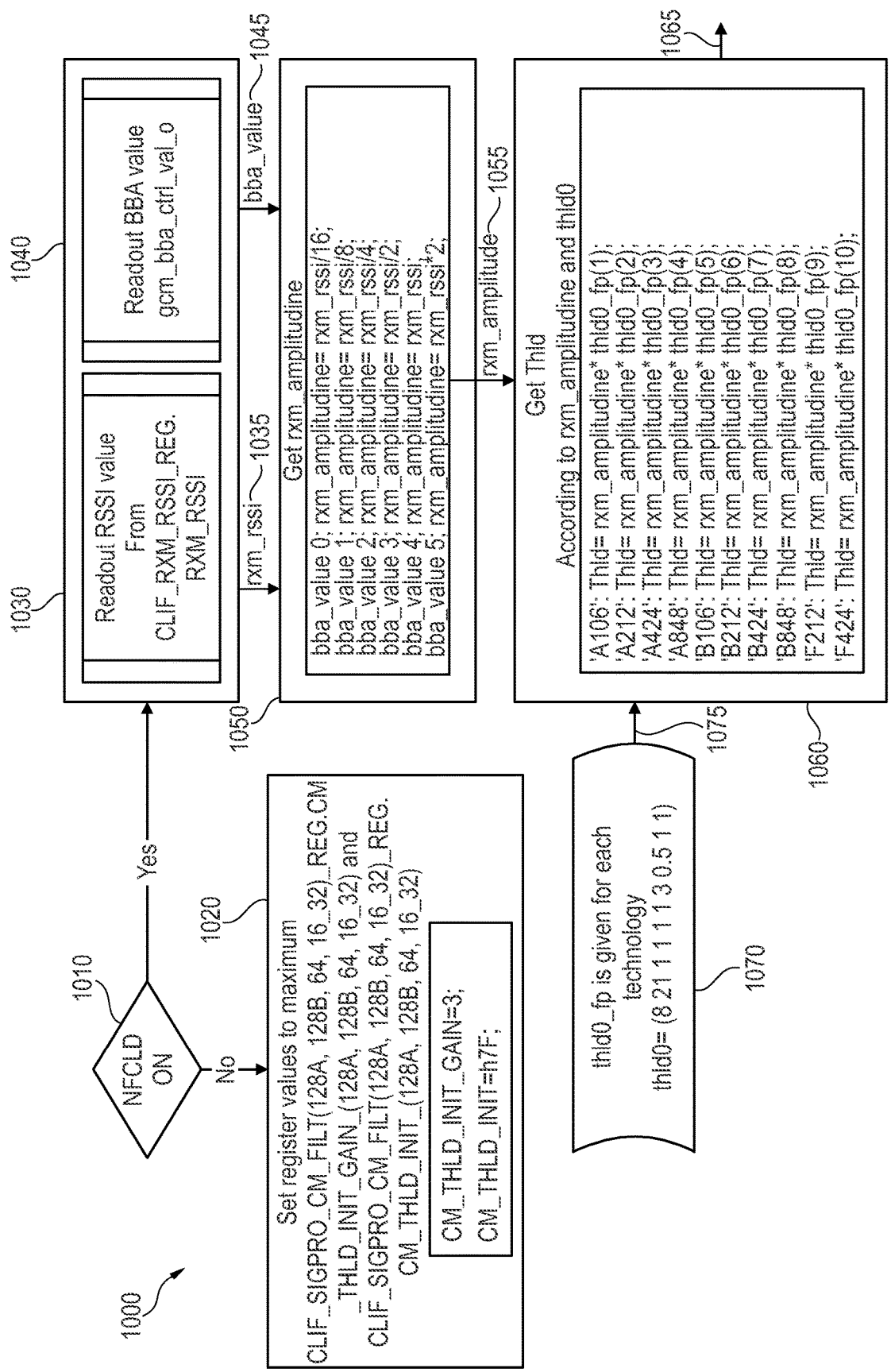
FIG. 10 illustrates a method of operating an NFC device, using dynamic threshold calculation, according to embodiment examples of the present invention.
Figure 10:
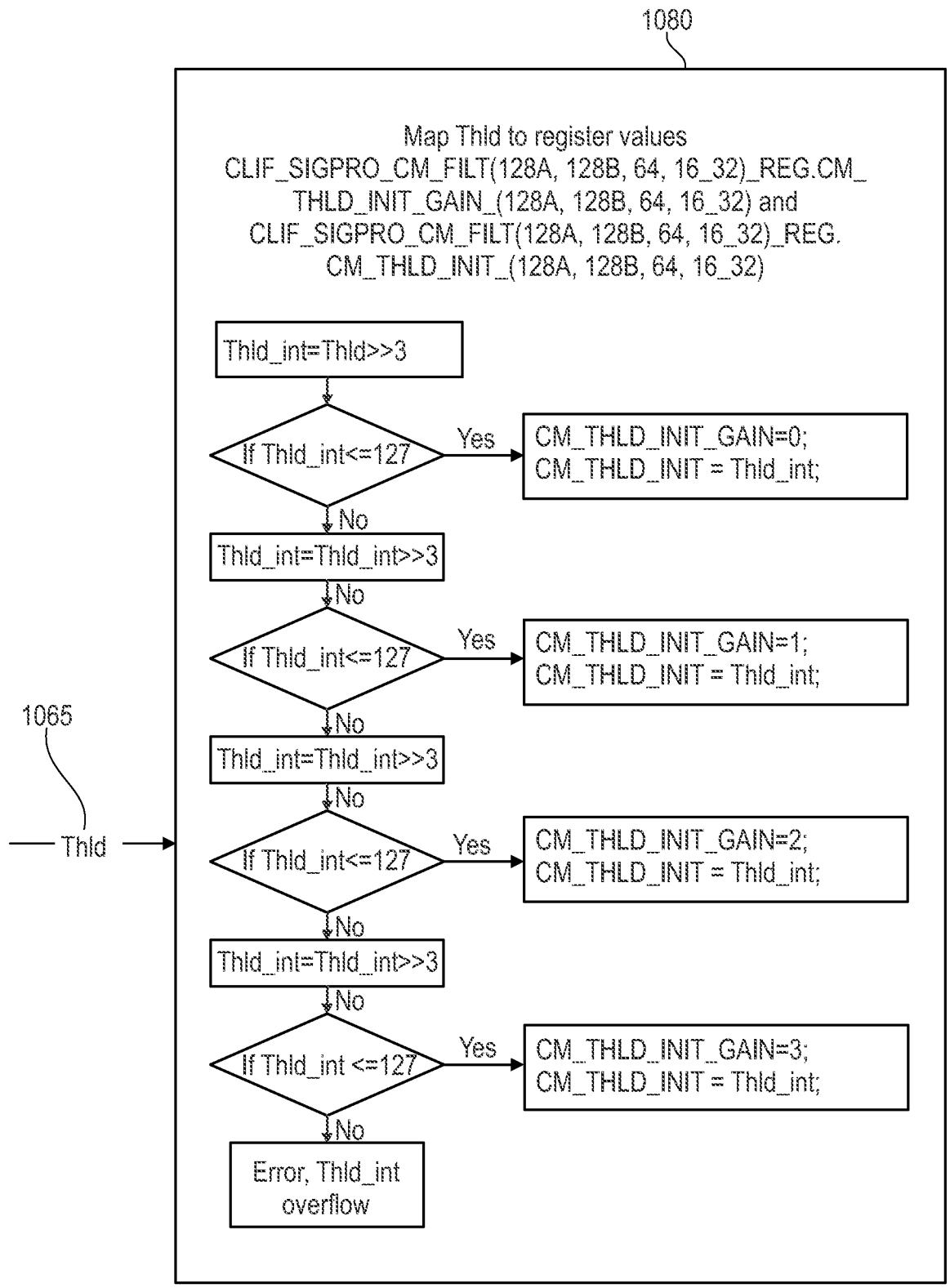

FIG. 10 illustrates a method 1000 of operating an NFC device 1120, 1160, using dynamic threshold calculation, according to embodiment examples of the present invention.

The method 1000 starts and proceeds to step 1010, wherein it is checked whether the detected field strength is above the minimum threshold (see 722 in FIG. 7, and 944 in FIG. 9) or not. Correspondingly in step 1010, it is tested, whether the NFC level detection filter is operating (NFCLD ON in FIGS. 7 and 9) or not (NFCLD OFF in FIGS. 7 and 9).

If the result of the test in step 1010 is "no", the method proceeds to step 1020, wherein the threshold value is set to a maximum value, so that the level detection and the signal downstream of the threshold comparison unit are effectively switched off.

If the result of the test in step 1010 is "yes", the method proceeds to step 1030, wherein a current measured RSSI value is read-out from the RSSI measurement unit (see 256 in FIG. 3B). Consequently, the measured RSSI value 1035 is provided as input to a step 1050.

The method further proceeds to step 1040, wherein a currently determined GC value is read-out from the GC value determining unit (see 254 in FIG. 3B). Consequently, the determined GC value 1045 is provided as input to step 1050.

The method then proceeds to step 1050, wherein the measured RSSI value 1035 and the determined GC value 1045 are taken as input, and a compensated RSSI value 1055, for example the measured RSSI value 1035 divided by the determined GC value 1045, is calculated. Consequently, the compensated RSSI value 1055 is provided as input to a step 1060.

The method then proceeds to step 1060, wherein a threshold value 1065 is dynamically calculated as a function of the measured RSSI value 1035 and the determined GC value 1045, for example as a function of the compensated RSSI value 1055, and further as a function of retrieved calibration values 1075, for example the margin value, which have been determined in a calibration procedure after the manufacture of the NFC device in dependency of the technology, for example as represented by the applicable signal pattern. Consequently, the calculated threshold value 1065 is provided as input to a step 1080.

The method comprises the step 1070, wherein the calibration values according to technology, for example as represented by the signal pattern, including in particular the margin value, are retrieved, and are provided to the step 1060.

Finally, the method proceeds to step 1080, wherein the calculated threshold value 1065 is mapped to a register value that is to be stored in a threshold value register (see 257 in FIG. 3B) for input and use in the threshold comparison unit (see 262 in FIG. 3B).

The method steps 1010, 1020, 1030, 1040, 1050, 1060, 1070 and 1080 of the method 1000 illustrated in FIG. 10 have been described in the foregoing in generic terminology.

As an illustration that the method steps are implemented in an NFC device at the level of, and by, firmware, the boxes in FIG. 10 corresponding to the method steps contain sets of instructions, which are expressed in a firmware language only by way of example for a concrete implementation of the dynamic threshold calculation according to the present invention and illustrated schematically in FIG. 9.

In this specification, example embodiments have been presented in terms of a selected set of details. However, a person of ordinary skill in the art would understand that many other example embodiments may be practiced which include a different selected set of these details. It is intended that the following claims cover all possible example embodiments.

Supplementary, it is to be noted that "having" or "comprising" does not exclude other elements or steps, and that "a" or "an" does not exclude a plurality. In addition, it is to be noted that features or steps, which have been described above with reference to one of the above embodiment examples, may also be used in combination with other features or steps of other embodiment examples that have been described above. Reference numerals in the claims are not to be construed as limitations.

LIST OF REFERENCE NUMERALS

100 NFC device
102 NFC receiver device
110 analogue front end
112 input port for RX signal
114 high-frequency attenuator
120 I&Q demodulating block
122 input branching node
123 I-channel
124 mixer of I-channel
126 baseband amplifier of I-channel
128 analogue digital converter of I-channel
130 digital I-channel signal output, I
132 high-frequency cw reference signal
134 90° phase shifter
135 Q-channel
136 mixer of Q-channel
138 baseband amplifier of Q-channel
140 analogue digital converter of Q-channel
142 digital Q-channel signal output, Q
144 I&Q channel combiner unit
146 combined digital output signal, S
148 signal processing block
150 gain control block
152 gain control value
200 NFC receiver device
220 I&Q demodulating block
223 I-channel
224 mixer of I-channel 226 baseband amplifier of I-channel
228 analogue digital converter of I-channel
230 digital I-channel signal output, I
235 Q-channel
236 mixer of Q-channel
238 baseband amplifier of Q-channel
240 analogue digital converter of Q-channel
242 digital Q-channel signal output, Q
244 I&Q channel combiner unit
246 combined digital output signal, S
248 signal processing block
250 gain control, GC, block
252 GC value
254 GC value determining unit
255 GC value register
256 received signal strength indicator, RSSI, measurement unit
257 RSSI value register
258 (static, conventional) threshold value setting unit
260 threshold value
262 (dynamic) threshold value calculating unit
264 RSSI value
266 GC value
300 signal processing block
302 first differential filter unit
304 first time-derivative signal
306 threshold comparison unit
308 next envelope signal/binary output
310 multiplexer unit
312 second differential filter unit
314 second time-derivative signal
316 zero crossing detection unit
320 zero crossing detection signal
322 envelope signal/multiplexed next envelope signal
324 decoder block
344 channel combiner unit
346 combined digital output signal, S
358 (static, conventional) threshold value setting unit
360 threshold value
362 (dynamic) threshold value calculating unit
400 diagram
410 combined digital output signal (from the channel combiner unit)
412 low level signal
414 rising edge
416 high level signal
418 falling edge
420 first time-derivative signal
422 zero first derivative signal
424 positive maximum
425 positive threshold
426 negative maximum
427 negative threshold
428 second time-derivative signal zero crossing on peak of first time-derivative signal
430 next envelope signal
432 low level next envelope signal
434 rising edge
436 high level next envelope signal
438 falling edge
440 second time-derivative signal
442 zero second derivative signal
444 positive peak
446 negative peak
448 zero crossing
450 envelope signal
452 low level envelope signal
454 rising edge
456 high level envelope
458 falling edge
460 envelope changes on second time-derivative signal zero crossing
500 diagram
502 horizontal axis
504 vertical axis
510 detected RF field signal
512 start of signal
514 reader-generated field
516, 516', 516", 516$^{(3)}$, 516$^{(4)}$ card transmission signal
518 end of signal
520 instrumentation signal
522, 522', 522", 522$^{(3)}$ output value toggle
524 threshold update after RF field ON
526 threshold update before Tx
528 threshold update on periodic timer
610 diagram
612 horizontal axis
614 vertical axis
616 combined digital output signal, S
620 diagram
622 horizontal axis
624 vertical axis
626 absolute value of first time-derivative signal
628 threshold value signal
630 diagram
632 horizontal axis
634 vertical axis
636 edge detector filter output signal
640 diagram
642 horizontal axis
644 vertical axis
646 absolute value of first time-derivative signal
648 threshold value signal
650 diagram
652 horizontal axis
654 vertical axis
656 edge detector filter output signal
660 diagram
662 horizontal axis
664 vertical axis
665 first differential filter gain
666 minimum peak level
667 combined digital output signal, S
668 confidence level
669 absolute value of first time-derivative signal
670 threshold
671 minimum peak level*confidence level
672 combined digital output signal without modulation
700 diagram
702 horizontal axis
704 vertical axis
706 field strength
708 combined digital output signal, S
710 RSSI/function
712 noise level
714 first time-derivative signal
716 threshold
718 confidence level
720 margin
722 NFCLD ON threshold
724 compensation with GC value
800 diagram
801 signal pattern (ISO 14443-2 signal pattern or FeliCa signal pattern)

802 horizontal axis/pattern condition number
803 vertical axis/filter gain in magnitude
804 pattern with lowest associated first differential filter gain
805 lowest first differential filter gain
806 confidence level
807 threshold (THLD)
808 threshold for implementation (THLD_fp)
809 noise floor
810 diagram
820 diagram
830 diagram
840 diagram
850 diagram
860 diagram
870 diagram
880 diagram
890 diagram
900 combined diagram
910 first diagram
912 x1-axis/field strength, FS
914 y1-axis/combined digital output signal, S
916 RSSI
918 gain 4
920 gain 3
922 gain 2
924 gain 1
926 gain 0
928 field strength 1 (FS1)
930 RSSI1
932 S1
934 compensation with GC value 1
936 field strength 2 (FS2)
938 RSSI2
940 S2
942 compensation with GC value 2
944 NFCLD ON threshold
950 second diagram
952 x2-axis/calculated threshold value
954 y2-axis/combined digital output signal, S
956 margin, M
957 first (lowest) threshold
958 second threshold
959 maximum threshold
960 third diagram
962 x3-axis/pattern condition number
952 first y3-axis/calculated threshold value
963 second y3-axis/first differential filter gain (matched filter gain)
964 pattern with lowest associated first differential filter gain
965 lowest first differential filter gain
966 confidence level
967 threshold (THLD)
968 threshold for implementation (THLD_fp)
969 noise floor
970 when threshold at maximum, decoder is switched off
971 pattern diversity
1000 method
1010 NFCLD=on?
1020 set threshold value to maximum
1030 read-out current measured RSSI value
1035 measured RSSI value
1040 read-out currently determined GC value
1045 determined GC value
1050 calculate compensated RSSI value (RSSI/GC)
1055 compensated RSSI value (RSSI/GC)
1060 dynamically calculate threshold value
1065 calculated threshold value
1070 retrieve calibration values according to technology/ISO pattern
1075 retrieved calibration values
1080 map calculated threshold value to register value
1100 near-field communication, NFC, arrangement
1110 polling NFC communication device
1120 NFC device
1122 receiver
1124 processing unit
1126 transmitter
1128 antenna interface
1130 antenna/coil
1131, 1132, 1133 data paths for signal flow in receiving mode
1134, 1135, 1136 data paths for signal flow in transmitting mode
1140 coupling
1150 listening NFC communication device
1160 NFC device
1162 receiver
1164 processing unit
1166 transmitter
1168 antenna interface
1170 antenna/coil
1171, 1172, 1173 data paths for signal flow in receiving mode
1174, 1175, 1176 data paths for signal flow in transmitting mode

The invention claimed is:

1. A method for sensitivity control in a near-field communication, NFC, device operating as a listening NFC device in a receiving mode, the method having:
 a) determining a current received signal strength indicator, RSSI, value as a function of the digital signal output, I, of an I-channel, and the digital signal output, Q, of a Q-channel, of an I&Q demodulating block;
 b) combining the digital signal output of the I-channel, and the digital signal output of the Q-channel, using an I&Q channel combiner unit, to yield a combined digital output signal, S, according to $S=\sqrt{(I^2+Q^2)}$;
 c) generating a first time-derivative signal, which is indicative for a derivation with respect to time of the combined digital output signal as a filter output, from a first differential filter unit that receives the combined digital output signal as input;
 d) calculating a threshold value, using a threshold value calculating unit, as a function of the determined current RSSI value, and
 e) applying the calculated threshold value as a threshold parameter to a threshold comparison unit, which is configured to receive the first time-derivative signal as input, to compare the first time-derivative signal with the applied threshold parameter, and to provide a binary output that is indicative of whether the input first time-derivative signal is greater than the applied threshold parameter or not, wherein when a radio frequency (RF) field external to the NFC device has a detected field strength that is below a pre-determined minimum threshold field strength, a decoder connected in a signal processing path downstream of the threshold comparison unit is disabled.

2. The method according to claim 1, further having:
 a.ii) determining a current gain control, GC, value as a function of the digital signal output of the I channel, and the digital signal output of the Q channel, wherein the GC value is configured to be applied as an amplifier gain parameter both to an I-channel amplifier connected upstream of an I-channel analogue digital converter in the I-channel and to a Q-channel amplifier connected upstream of a Q-channel analogue digital converter in the Q-channel, and wherein step d) comprises calculating the threshold value, using the threshold value calculating unit, as a function of the determined current RSSI value and of the determined current GC value.

3. The method according to claim 2, wherein step d) comprises calculating the threshold value, using the threshold value calculating unit, as a function of the determined current RSSI value, of the determined current GC value, and of a margin value, which is indicative for the difference between an initial threshold value and a noise floor value associated with the generated first time-derivative signal.

4. The method according to claim 3, wherein the margin value is a product-specific parameter, which is stored in a non-volatile memory of the NFC device, and which is determined in a calibration procedure performed after the manufacture of the NFC device and before delivery of the NFC device and/or the building-in of the NFC device in a communication device, such as a smart phone, a tablet, or a smart card.

5. The method according to claim 3, wherein the margin value is determined, in a calibration procedure, as a function of each one of the following:
  1) a type of a communication signal interface, which is associated with the NFC device (100), in particular associated with one of:
  i) type A, as specified in ISO 14443-2-A/NFCForum specifications,
  ii) type B, as specified in ISO 14443-2-B/NFCForum specifications,
  iii) type F, as specified in FeliCa protocol/NFCForum Analogue specifications;
  2) a bitrate of the combined digital output signal, in particular one of:
  i) for an A-type communication signal interface, a bitrate, in kbps,
  ii) for an B-type communication signal interface, a bitrate, in kbps,
  iii) for an F-type communication signal interface, a bitrate, in kbps;
  3) a confidence level, which is a product-specific parameter, which is stored in a non-volatile memory of the NFC device, which is determined in a calibration procedure performed after the manufacture of the NFC device and before delivery of the NFC device and/or the building-in of the NFC device in a communication device, such as a smart phone, a tablet, or a smart card, and which represents a ratio of a threshold value determined in the calibration and a filter gain of the first differential filter unit,
  wherein the confidence level is in particular determined to be between 20% and 90%, more particular between 30% and 80%, more in particular between 40% and 70%, and still more particular 60%.

6. The method according to claim 5, wherein the margin value, M, is determined for a plurality of combinations of type of a communication signal interface and bitrate, in particular for each one of the following combinations of type of a communication signal interface and bitrate:
  i) A-106, A-212, A-424, A-848,
  ii) B-106, B-212, B-424, B-848, and
  iii) F-212, F-424, and
  wherein an ISO 14443-2 signal pattern or Felica signal pattern is associated to each of the specified combinations, which pattern specifies, for each one of a predetermined plurality of signal pattern conditions, an associated gain of the first differential filter unit, and wherein the margin value, M, is determined with respect to the first differential filter unit gain of that signal pattern condition, to which the lowest first differential filter unit gain is associated.

7. The method according to claim 2, wherein the threshold value is calculated according to:

THLD=$M$*RSSI/GC, wherein THLD is the calculated threshold value, M is a margin value, RSSI is the determined current RSSI value, and GC is the current gain control value.

8. The method according to claim 1, wherein a calculation and adjustment of the threshold is performed at one or more occasions that are included in the group, which comprises:
  1. after a detection by the reader of an RF field, to which the reader is exposed,
  2. if the NFC reader is part of an NFC device that is capable to switch between a receiving mode and a transmitting mode, the calculation and adjustment of the threshold may be performed immediately before, or after, the switching to the transmitting mode and a related data transmission by the NFC device, or
  3. with a configurable period during a reception wait time, in particular a default period of 10 ms.

9. The method of claim 1, wherein the method is implemented in a computer program product stored in a machine-readable non-transitory storage medium which controls or executes the method when run on a data processing system, such as a processor, a micro-processor, or a computer.

10. A near-field communication, NFC, device configured to have a controllable sensitivity, wherein the NFC device has:
  an I&Q demodulating block having an I-channel and a Q-channel, wherein the I-channel is configured to output a digital I-channel signal output, I, and the Q-channel is configured to output a digital Q-channel signal output, Q;
  an I&Q channel combiner unit having an input configured to receive the digital I-channel signal output, an input configured to receive the digital Q-channel signal output, and an output configured to output a combined digital output signal, S, that is determined as a function of the digital I-channel signal output and the digital Q-channel signal output according to S=$\sqrt{(I^2+Q^2)}$;
  a received signal strength indicator, RSSI, measurement unit configured to receive the digital signal output of the I-channel and the digital signal output of the Q-channel, and to determine a current received signal strength indicator, RSSI, value as a function of the digital signal output of the I-channel and the digital signal output of the Q-channel;
  a first differential filter unit, which is configured to receive the combined digital output signal as input and to generate a first time-derivative signal, which is indicative for a derivation with respect to time of the combined digital output signal, as a filter output;
  a threshold value calculating unit, which is configured to receive the determined current RSSI value and to calculate a threshold value as a function of the determined current RSSI value and to provide the calculated threshold value as output;
  a threshold comparison unit, which is configured to receive the first time-derivative signal as input, to receive the calculated threshold value as an applied threshold parameter, to compare the first time-derivative signal with the applied threshold parameter, and to provide a binary output that is indicative of whether the input first time-derivative signal is greater than the applied threshold parameter or not; and a gain control (GC) value determining unit configured to receive as inputs the digital signal output of the I channel and the digital signal output of the Q channel, and to determine a current GC value as a function of the digital signal output of the I channel and the digital signal output of the Q channel, wherein the determined current GC value is configured to be applied as an amplifier gain parameter both to an I channel amplifier connected upstream of an I channel analog digital converter in the I channel and to a Q channel amplifier connected upstream of a Q channel analog digital converter in the Q channel, and wherein the threshold value calculating unit is configured to receive the determined current RSSI value and the determined current GC value as inputs, and to calculate the threshold value as a function of the determined current RSSI value and of the determined current GC value.

11. The NFC device according to claim 10, wherein the threshold value calculating unit is configured to calculate the threshold value as a function of the determined current RSSI value, of the determined current GC value, and of a margin value, M, which is indicative for the difference between an initial threshold value and a noise floor value associated with the generated first time-derivative signal.

12. The NFC device according to claim 10, wherein the threshold value calculating unit is configured to calculate the threshold value according to:

THLD=$M$*RSSI/GC, wherein THLD is the calculated threshold value, M is a margin value, RSSI is the determined current RSSI value, and GC is the current gain control value.

13. The NFC device according to claim 12, wherein the margin value is a product-specific parameter, which is stored in a non-volatile memory of the NFC device, and which is determined in a calibration procedure performed after the manufacture of the NFC device and before delivery of the NFC device and/or the building-in of the NFC device in a communication device, such as a smart phone, a tablet, or a smart card, and/or wherein the margin value is determined, in a calibration procedure, as a function of each one of the following:

1) a type of a communication signal interface, which is associated with the NFC device, in particular associated with one of:
i) type A, as specified in ISO 14443-2-A/NFCForum specifications,
ii) type B, as specified in ISO 14443-2-B/NFCForum specifications,
iii) type F, as specified in FeliCa protocol/NFCForum Analogue specifications;
2) a bitrate of the combined digital output signal, in particular one of:
i) for an A-type communication signal interface, a bitrate, in kbps,
ii) for an B-type communication signal interface, a bitrate, in kbps
iii) for an F-type communication signal interface, a bitrate, in kbps;
3) a confidence level, which is a product-specific parameter, which is stored in a non-volatile memory of the NFC device, which is determined in a calibration procedure performed after the manufacture of the NFC device and before delivery of the NFC device and/or the building-in of the NFC device in a communication device, such as a smart phone, a tablet, or a smart card, and which represents a ratio of a threshold value determined in the calibration and a filter gain of the first differential filter unit, wherein the confidence level is in particular determined to be between 20% and 90%, more particular between 30% and 80%, more in particular between 40% and 70%, and still more particular 60%.

14. The NFC device according to claim 10, wherein the NFC device is configured to perform a calculation and adjustment of the threshold at one or more of occasions that are included in the group, which comprises:

1. after a detection by the reader of an RF field, to which the reader is exposed,
2. if the NFC reader is part of an NFC device that is capable to switch between a receiving mode and a transmitting mode, the calculation and adjustment of the threshold may be performed immediately before, or after, the switching to the transmitting mode and a related data transmission by the NFC device, or
3. with a configurable period during a reception wait time, in particular a default period of 10 ms.

15. The NFC device according to claim 10, further comprising an RSSI value register configured to store a value that is indicative for the determined current RSSI value and to provide the stored value to the threshold value calculation unit.

16. The NFC device according to claim 10, further comprising a GC value register configured to store a value that is indicative for the determined current GC value and to provide the stored value to the threshold value calculation unit.

17. The NFC device according to claim 10, further comprising a non-volatile storage device configured to store a margin value and/or configured to store a confidence level.

18. The NFC device according to claim 10, further comprising:

a decoder that is connected, in a signal processing path, downstream of the threshold comparison unit,
an external RF field presence detection unit configured to detect if an RF field external to the NFC device has a detected field strength that is below a pre-determined minimum threshold field strength,
wherein the NFC device is configured to disable the decoder and/or to set the threshold value applied to the threshold comparison unit to a maximum value, if the detected field strength is below the pre-determined minimum threshold field strength.

* * * * *